(12) United States Patent
Kaneko et al.

(10) Patent No.: US 7,387,107 B2
(45) Date of Patent: Jun. 17, 2008

(54) KNOCKING STATE DETERMINATION DEVICE

(75) Inventors: Rihito Kaneko, Nishikamo-gun (JP);
Kenji Kasashima, Nishikamo-gun (JP);
Masatomo Yoshihara, Toyota (JP);
Koji Aso, Susono (JP); Kenji Senda,
Okazaki (JP); Shigeru Kamio, Nagoya
(JP); Yuichi Takemura, Anjo (JP)

(73) Assignees: Toyota Jidosha Kabushiki Kaisha,
Toyota-shi (JP); Denso Corporation,
Kariya-shi (JP)

( * ) Notice: Subject to any disclaimer, the term of this patent is extended or adjusted under 35 U.S.C. 154(b) by 2 days.

(21) Appl. No.: 11/475,230

(22) Filed: Jun. 27, 2006

(65) Prior Publication Data

US 2007/0084266 A1    Apr. 19, 2007

(30) Foreign Application Priority Data

Jun. 28, 2005    (JP)    ............................... 2005-188346

(51) Int. Cl.
*F02P 5/152*    (2006.01)
*F02P 5/00*    (2006.01)

(52) U.S. Cl. .............................. 123/406.21; 123/406.29
(58) Field of Classification Search ........... 123/406.21, 123/406.29, 406.37, 406.38, 406.39, 406.33, 123/406.58, 406.64; 73/35.01, 35.04
See application file for complete search history.

(56) References Cited

U.S. PATENT DOCUMENTS

| 4,825,832 A | * | 5/1989 | Satoh et al. ............ 123/406.21 |
| 4,844,027 A | * | 7/1989 | Nakamura ............... 123/406.33 |
| 5,186,145 A | * | 2/1993 | Sakakibara ............. 123/406.16 |
| 5,355,853 A | | 10/1994 | Yamada et al. |
| 5,386,367 A | | 1/1995 | Ziegler et al. |
| 5,783,744 A | * | 7/1998 | Chun ........................... 73/116 |
| 6,230,546 B1 | | 5/2001 | Wilstermann et al. |
| 2002/0179053 A1 | | 12/2002 | Kokubo et al. |
| 2003/0005749 A1 | * | 1/2003 | Nishimura ................ 73/35.01 |
| 2005/0000272 A1 | | 1/2005 | Takemura et al. |

FOREIGN PATENT DOCUMENTS

| DE | 103 43 146 A1 | 4/2005 |
| GB | 2 245 382 A | 1/1992 |
| JP | 59-138773 | 8/1984 |
| JP | 64-12070 | 1/1989 |
| JP | 11-324785 | 11/1999 |
| JP | 2000-265933 | 9/2000 |
| JP | 2002-188504 | 7/2002 |
| JP | 2003-21032 | 1/2003 |
| JP | 2004-52750 | 2/2004 |

* cited by examiner

*Primary Examiner*—Mahmoud Gimie
(74) *Attorney, Agent, or Firm*—Oblon, Spivak, McClelland, Maier & Neustadt, P.C.

(57) ABSTRACT

An engine ECU executes a program including the steps of: calculating a correlation coefficient K based on the result of comparing a vibration waveform of an engine and a knock waveform model stored previously; calculating a magnitude value LOG(V) from the magnitude V detected based on a signal transmitted from a knock sensor; creating frequency distribution of magnitude values LOG(V) by using magnitude values LOG(V) in an ignition cycle in which the correlation coefficient K larger than a threshold K(1) is calculated; and counting knock proportion KC by using the created frequency distribution. If the vibration waveform includes a waveform of vibration of noise components, the correlation coefficient K is calculated to be smaller comparing with a case of not including it.

20 Claims, 19 Drawing Sheets

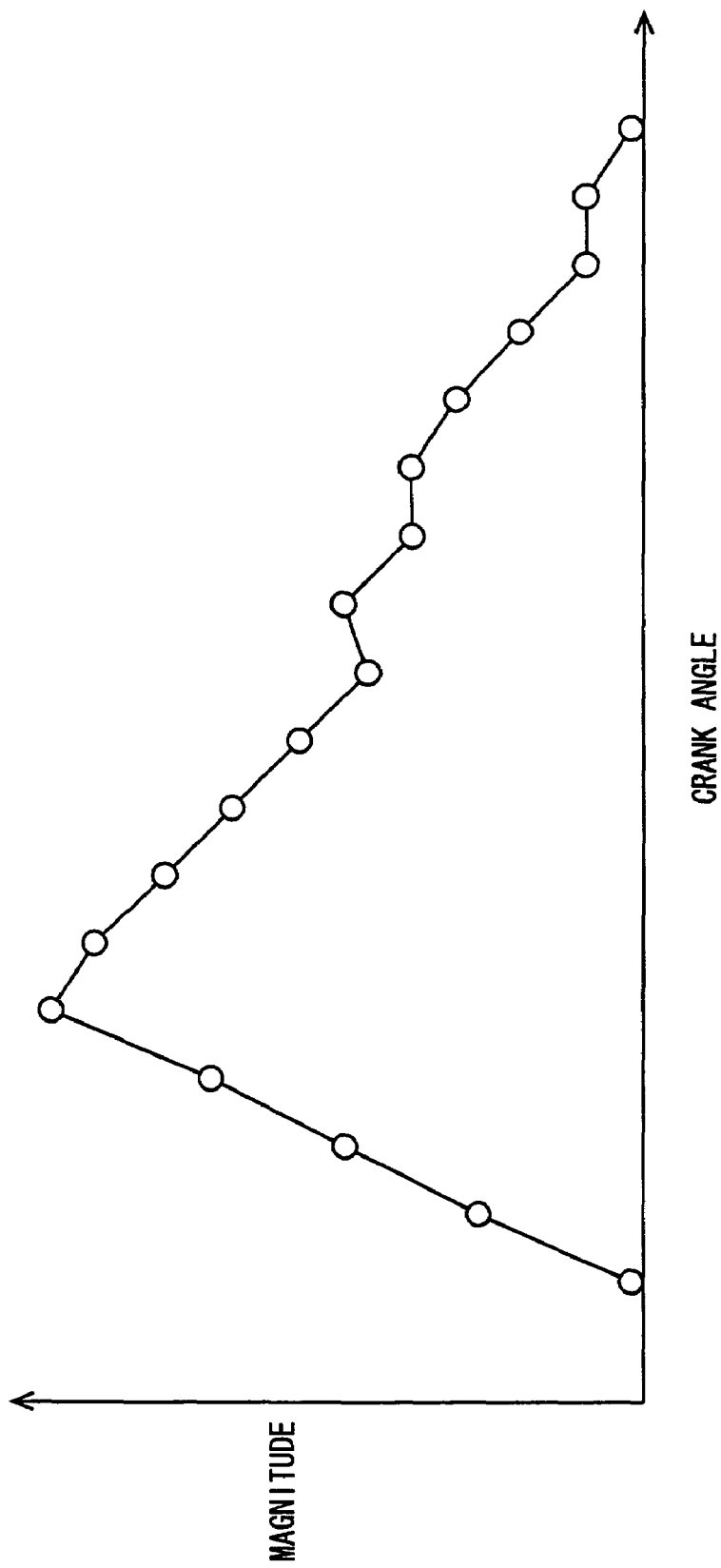
F I G. 4

KNOCKING STATE DETERMINATION DEVICE

This nonprovisional application is based on Japanese Patent Application No. 2005-188346 filed with the Japan Patent Office on Jun. 28, 2005, the entire contents of which are hereby incorporated by reference.

BACKGROUND OF THE INVENTION

1. Field of the Invention

The present invention relates to a knocking state determination device and particularly to a technique of determining a knocking occurrence state based on a waveform of vibration generated in an internal combustion engine.

2. Description of the Background Art

Conventionally, there have been proposed various methods of determining whether knocking (knock) is present or absent. A knock control device of an internal combustion engine described in Japanese Patent Laying-Open No. 2003-021032 includes a knock sensor for detecting a knock of the internal combustion engine, a statistical processing portion for statistically processing an output signal detected by the knock sensor, a first temporary determination portion for determining whether or not the knock has occurred based on a processing result by the statistical processing portion, a second temporary determination portion for determining whether or not the knock has occurred based on a waveform of the output signal detected by the knock sensor, and a final knock determination portion for finally determining whether or not the knock has occurred based on the results of the knock temporary determination by the first temporary determination portion and the knock temporary determination by the second temporary determination portion. The final knock determination portion finally determines that whether or not the knock has occurred when both the first temporary determination portion and the second temporary determination portion determine that the knock has occurred.

With the knock control device described in this official gazette, the knock temporary determination by a statistical processing program and the knock temporary determination by a waveform program are used and it is finally determined that the knock has occurred only when it is determined that the knock has occurred in the respective temporary determinations. Thus, with regard also to an output signal based on which knocking was detected erroneously by knocking determination using only one of the statistical processing program and the waveform program, it is possible to accurately determine whether or not the knocking has occurred.

However, in the knock control device described in Japanese Patent Laying-Open No. 2003-021032, the knocking determination by the statistical processing and the knocking determination by a shape of the waveform are performed independently of each other. Therefore, accuracy of each determination method is not improved and deterioration of the accuracy by a noise component is not resolved in each determination method. Therefore, the device is susceptible to further improvement so as to accurately determine whether the knocking is present or absent.

SUMMARY OF THE INVENTION

It is an object of the present invention to provide a knocking state determination device capable of determining a knocking occurrence state with high accuracy.

A knocking state determination device according to the present invention includes: a first detecting portion for detecting a waveform of vibration caused in the internal combustion engine at a predetermined interval for a crank angle; a memory portion for previously storing a waveform of vibration of the internal combustion engine; a second detecting portion for detecting magnitude values relating to magnitude of vibration caused in the internal combustion engine in a plurality of ignition cycles; an extracting portion for extracting magnitude values satisfying a predetermined condition among a plurality of magnitude values based on the result of comparing a detected waveform with a stored waveform; and a determining portion for determining a knocking occurrence state based on the magnitude values extracted.

According to the present invention, a waveform of vibration caused in the internal combustion engine is detected as a predetermined interval for a crank angle, and the detected waveform is compared with a waveform previously stored as a waveform of vibration caused by knocking for example. Further, magnitude values relating to the magnitude of vibration caused in the internal combustion engine are detected in a plurality of ignition cycles, and magnitude values satisfying predetermined conditions are extracted based on the result of comparing the detected waveform with the stored waveform among a plurality of magnitude values detected. Thereby, without extracting magnitude values in an ignition cycle in which a waveform same as or similar to the waveform of vibration caused by the vibration of noise components such as vibration due to seating of an intake/exhaust valve or fuel injection from an injector, other magnitude values can be extracted. That is, it is possible to remove magnitude values of vibration due to vibration of noise components. Based on such magnitude values, a knocking occurrence state is determined. Therefore, it is possible to determine the knocking occurrence state by suppressing effects of noise components. As a result, it is possible to provide a knocking state determination device capable of determining a knocking occurrence state with high accuracy.

It is preferable that the knocking state determination device further include: a knock magnitude calculating portion for calculating a knock magnitude relating to the magnitude of vibration caused by knocking, based on the result of comparing the stored waveform and the detected waveform and the magnitude of vibration caused in the internal combustion engine at the predetermined interval for the crank angle; and a knocking determining portion for determining whether knocking has occurred in the internal combustion engine for each ignition cycle based on the result of comparing the knock magnitude and a predetermined determination value.

According to the present invention, the knock magnitude relating to the magnitude of vibration caused by knocking is calculated based on the result of comparing the stored waveform and the detected waveform and the magnitude of vibration caused in the internal combustion engine at a predetermined interval for the crank angle. Thereby, the knock magnitude as a value used for determining knocking can be obtained while considering the waveform and the magnitude of vibration. Based on the result of comparing the knock magnitude and the predetermined determination value, it is determined whether knocking has occurred in the internal combustion engine for each ignition cycle. Thereby, in addition to the knocking determination based on the magnitude values detected in a plurality of ignition cycles, knocking determination can be performed for each ignition cycle. Therefore, a knocking occurrence state can be determined while considering both of the vibration state in the past ignition cycles and the vibration state in one ignition cycle. Consequently, it is possible to determine knocking occurrence state with high accuracy.

It is more preferable that the predetermined determination value be set based on at least one of the number of rotations of the internal combustion engine and the amount of air taken in the internal combustion engine.

According to the present invention, a determination value used for determining whether knocking has occurred for each cycle is set based on at least one of the number of rotations of the internal combustion engine and the amount of air taken in the internal combustion engine. Thereby, an appropriate determination value corresponding to the operational state of the internal combustion engine can be obtained. Therefore, it is possible to determine the knocking occurrence state with high accuracy.

It is more preferable that the knocking state determination device further include a correcting portion for correcting the predetermined determination value based on the determination result by the determining portion.

According to the present invention, a determination value used for determining whether knocking has occurred for each cycle is corrected based on the determination result of determining a knocking occurrence state by using the magnitude value extracted from the detected magnitude values in a plurality of ignition cycles. Thereby, in the case where the knocking occurrence frequency is said to be high considered from the vibration state of the past ignition cycles, it is possible to make it easy to determine that knocking has occurred in knocking determination for each ignition cycle by correcting the determination value in order that retardation of ignition timing when knocking occurs can be performed more frequently. In contrast, in the case where knocking occurrence frequency is said to be low considered from the vibration state of the past ignition cycles, it is possible to make it difficult to determine that knocking has occurred in knocking determination for each ignition cycle by correcting the determination value in order that advance of ignition timing when knocking does not occur can be performed more frequently. Therefore, it is possible to make ignition timing appropriate by making the determination value in knocking determination for each ignition cycle to be an appropriate value.

It is more preferable that the knocking state determination device further include a correcting portion for correcting the determination value based on the frequency that knocking is determined to have occurred in the internal combustion engine by using the knock magnitude.

According to the present invention, the determination value used for determining whether knocking has occurred for each ignition cycle is corrected based on the frequency that knocking is determined to have occurred in the internal combustion engine by using the knock magnitude. Thereby, in the case where the knocking occurrence frequency is said to be high, it is possible to determine that knocking has occurred in knocking determination for each ignition cycle by correcting the determination value in order that retardation of ignition timing when knocking occurs can be performed more frequently. In contrast, in the case where the knocking occurrence frequency is said to be low, it is possible to make it difficult to determine that knocking has occurred in knocking determination for each ignition cycle by correcting the determination value in order that advance of ignition timing when knocking does not occur can be performed more frequently. Therefore, it is possible to make ignition timing appropriate by making the determination value in knocking determination for each ignition cycle to be an appropriate value.

It is more preferable that the knocking state determination device further include: a first correcting portion for correcting the predetermined determination value based on a determination result by the determining portion; and a second correcting portion for correcting the determination value by the correction amount different from that of the first correcting portion, based on the frequency in which knocking is determined to have occurred in the internal combustion engine by using the knock magnitude.

According to the present invention, a determination value used for determining whether knocking has occurred for each cycle is corrected based on the determination result of determining a knocking occurrence state by using the magnitude values extracted from the detected magnitude values in a plurality of ignition cycles. Further, the determination value used for determining whether knocking has occurred for each ignition cycle is corrected based on the frequency that knocking is determined to have occurred in the internal combustion engine by using the knock magnitude. Thereby, in the case where the knocking occurrence frequency is said to be high, it is possible to determine that knocking has occurred in knocking determination for each ignition cycle by correcting the determination value in order that retardation of ignition timing when knocking occurs can be performed more frequently. In contrast, in the case where knocking occurrence frequency is said to be low, it is possible to make it difficult to determine that knocking has occurred in knocking determination for each ignition cycle by correcting the determination value in order that advance of ignition timing when knocking does not occur can be performed more frequently. Here, comparing the case of correcting the determination value based on the result of determining the knocking occurrence state by using the magnitude value based on the magnitude values detected in a plurality of ignition cycles with the case of correcting the determination value based on the frequency that knocking is determined to have occurred in the internal combustion engine by using the knock magnitude, the correction amounts are different. For example, in the case of correcting the determination value based on the frequency that knocking is determined to have occurred in the internal combustion engine by using the knock magnitude, the determination value is corrected by the larger correction amount than the case of correcting the determination value based on the result of determining the knocking occurrence state by using the magnitude value based on the magnitude values detected in a plurality of ignition cycles. Thereby, it is possible to determine that the knocking occurrence frequency is high from knocking determination for each ignition cycle, the determination value can be corrected promptly. Therefore, it is possible to make ignition timing appropriate by making the determination value in knocking determination for each ignition cycle to be an appropriate value.

It is more preferable that the second correcting portion correct the determination value by a correction amount larger than that of the first correcting portion.

According to the present invention, in the case of correcting the determination value based on the frequency that knocking is determined to have occurred in the internal combustion engine by using the knock magnitude, the determination value is corrected by the correction amount larger than the case of correcting the determination value based on the result of determining the knocking occurrence state by using the magnitude values based on the magnitude values detected in a plurality of ignition cycles. Thereby, if it is possible to determine that the knocking occurrence frequency is high from the knocking determination for each ignition cycle, the determination value can be corrected promptly. Therefore, it is possible to make ignition timing appropriate by making the determination value in knocking determination for each ignition cycle to be an appropriate value.

It is more preferable that the knocking state determination device further include a deviation calculating portion for calculating a value relating to a deviation between the detected waveform and the stored waveform. The knock magnitude calculating portion calculates the knock magnitude based on the value relating to the deviation and the magnitude of vibration caused in the internal combustion engine at the predetermined interval for the crank angle.

According to the present invention, a value relating to the deviation between the detected waveform and the stored waveform is calculated. Thereby, it is possible to objectively determine whether it is a waveform of vibration caused by knocking for example, by quantifying the different points between the detected waveform and the stored waveform. Based on the value relating to the deviation and the magnitude of vibration, the knock magnitude is calculated. Thereby, the knock magnitude in which a difference from the waveform of vibration caused by knocking is reflected appropriately as a numeric value can be obtained. Therefore, it is possible to determine whether knocking has occurred with high accuracy.

It is more preferable that the knocking state determination device further include an integrating portion for calculating an integrated value in which the magnitude of vibration caused in the internal combustion engine at the predetermined interval for the crank angle is integrated by the predetermined interval for the crank angle. The knock magnitude calculating portion calculates the knock magnitude based on the product of a value relating to the deviation and the integrated value.

According to the present invention, an integrated value is calculated in which the magnitude of vibration caused in the internal combustion engine at the predetermined interval for the crank angle is integrated by the predetermined interval for the crank angle. The vibration caused by knocking is attenuated gradually, and vibration caused by a noise component is attenuated quickly. Therefore, the integrated value of the magnitude of vibration due to knocking and the integrated value of the magnitude of vibration caused by a noise component are largely different. Based on the product of the integrated value and the value relating to the deviation, a knock magnitude is calculated. Thereby, a knock magnitude in which the difference between knocking and noise is large can be obtained. Based on such a knock magnitude, it is determined whether knocking has occurred in one cycle. Therefore, it is possible to determine whether knocking has occurred with high accuracy.

It is more preferable that the deviation calculating portion calculate values relating to the deviation smaller if the waveforms detected include a waveform of vibration caused by operations of predetermined parts of the internal combustion engine, comparing with the case of not including them. The predetermined condition is a condition that they are magnitude values in an ignition cycle in which values relating to a deviation larger than the predetermined value are calculated.

According to the present invention, values relating to the deviation calculated smaller if the waveforms detected includes a waveform of vibration caused by operations of predetermined parts of the internal combustion engine (vibration of noise components), comparing with the case of not including them. Magnitude values satisfying the condition that they are magnitude values in the ignition cycle in which values relating to the deviation larger than the predetermined value are calculated are extracted from the magnitude values detected in a plurality of ignition cycles. Thereby, it is possible to suppress a state where magnitude values in the ignition cycle in which a waveform including vibration of noise components are detected are mixed with the magnitude values extracted. That is, magnitude values excluding vibration of noise components can be extracted. Therefore, it is possible to determine a knocking occurrence state while suppressing effects of noise components. As a result, it is possible to determine the knocking occurrence state with high accuracy.

It is more preferable that the predetermined value be a maximum value of a value relating to a deviation calculated in a state where the internal combustion engine is operated such that vibration due to the operation of the predetermined part is caused at a predetermined interval.

According to the present invention, magnitude values are extracted which satisfy a condition that they are magnitude values in the ignition cycle in which a value, relating to a deviation satisfying a condition that it is larger than the maximum value of a value relating to the deviation when a waveform of vibration including noise components is detected, is calculated. Thereby, it is possible to exclude magnitude values considered as magnitude values of vibration of noise components and extract magnitude values. Therefore, based on the magnitude values considered as not magnitude values of vibration of noise components, knocking occurrence state can be determined. As a result, it is possible to determine a knocking occurrence state with high accuracy while suppressing effects of noise components.

It is more preferable that the predetermined part is at least one of a piston, an injector, a suction valve, and an exhaust valve.

According to the present invention, it is possible to suppress the noise component generated due to at least one of the piston, the injector, the intake valve, and the exhaust valve to accurately determine the knocking occurrence state.

It is more preferable that the knocking state determination device further include a deviation calculating portion for calculating a value relating to a deviation between the detected waveform and the stored waveform based on the result of comparing the detected waveform with the stored waveform. The deviation calculating portion calculates a value relating to the deviation smaller if the detected waveform includes a waveform of vibration caused by operations of predetermined parts of the internal combustion engine, compared with a case of not including it. The predetermined condition is a condition that they are magnitude values in an ignition cycle in which a value relating to a deviation larger than a predetermined value is calculated.

According to the present invention, a value relating to the deviation between the detected waveform and the stored waveform is calculated based on the result of comparing the detected waveform and the stored waveform. A value relating to the deviation is calculated smaller if the waveform detected includes a waveform of vibration caused by operations of predetermined parts of the internal combustion engine (vibration of noise components), comparing with the case of not including them. Magnitude values satisfying the condition that they are magnitude values in the ignition cycle in which a value relating to the deviation larger than the predetermined value is calculated are extracted from the magnitude values detected in a plurality of ignition cycles. Thereby, it is possible to suppress a state where magnitude values in the ignition cycle in which a waveform including vibration of noise components is detected are mixed with the magnitude value extracted. That is, magnitude values excluding vibration of noise components can be extracted. Therefore, it is possible to determine a knocking occurrence state while suppressing effects of noise components. As a result, it is possible to determine a knocking occurrence state with high accuracy.

It is more preferable that the predetermined value be a maximum value of a value relating to a deviation calculated in a state where the internal combustion engine is operated such that vibration by the operation of the predetermined part is caused at a predetermined interval.

According to the present invention, magnitude values are extracted which satisfy a condition that they are magnitude values in the ignition cycle in which a value, relating to a deviation satisfying a condition that it is larger than the maximum value of a value relating to the deviation when a waveform of vibration including noise components is detected, is calculated. Thereby, it is possible to exclude magnitude values considered as magnitude values of vibration of noise components, and extract magnitude values. Therefore, based on the magnitude values considered as not magnitude values of vibration of noise components, a knocking occurrence state can be determined. As a result, it is possible to determine a knocking occurrence state with high accuracy while suppressing effects of noise components.

It is more preferable that the predetermined part is at least one of a piston, an injector, a suction valve, and an exhaust valve.

According to the present invention, it is possible to suppress the noise component generated due to at least one of the piston, the injector, the intake valve, and the exhaust valve to accurately determine the knocking occurrence state.

It is more preferable that the knocking state determination device further include a level calculating portion for calculating a knock determination level based on the extracted magnitude values. The determining portion determines a knocking occurrence state based on the result of comparing the extracted magnitude values with the knock determination level.

According to the present invention, the knock determination level is calculated based on the extracted magnitude value. In this way, it is possible to obtain the knock determination level on which the magnitude value in the past ignition cycle is reflected. Therefore, it is possible to obtain the knock determination level in consideration of influences of the operation state and individual specificity of the internal combustion engine on the magnitude value. Based on the result of comparing the knock determination level and the extracted magnitude value, a knocking occurrence state is determined. Thereby, it is possible to determine the knocking occurrence state with high accuracy corresponding to the operating state of the internal combustion engine and individual differences.

It is more preferable that the level calculating portion calculate the knock determination level when a plurality of magnitude values not less than the predetermined number are extracted.

According to the present invention, the knock determination level is calculated when a plurality of magnitude values not less than the predetermined number are extracted. Thereby, the knock determination level can be calculated based on magnitude values for the number of ignition cycles appropriate for determining the knocking occurrence state. Therefore, it is possible to obtain the knock determination level while appropriately considering effects affected on the magnitude values by the operating state of the internal combustion engine and individual differences.

It is more preferable that the determining portion determine the knocking occurrence frequency based on the result of comparing the extracted magnitude values and the knock determination level.

According to the present invention, the knocking occurrence frequency is determined. Here, presence or non-presence of knocking causing a sound audible by passengers of the vehicle has a correlation with the knocking occurrence frequency. Therefore, it is possible to determine presence or non-presence of knocking causing a sound audible by passengers of the vehicle by determining the knocking occurrence frequency.

It is more preferable that the determining portion determine frequency that magnitude values larger than the knock determination level are extracted, among the extracted magnitude values, as the knocking occurrence frequency.

According to the present invention, frequency that magnitude values larger than the knock determination level are extracted is determined as the knocking occurrence frequency. Here, presence or non-presence of knocking causing a sound audible by passengers of the vehicle has a correlation with the knocking occurrence frequency. Therefore, it is possible to determine presence or non-presence of knocking causing a sound audible by passengers of the vehicle by determining the knocking occurrence frequency.

It is more preferable that the level calculating portion calculate the knock determination level by adding a product of a standard deviation in the extracted magnitude values and a predetermined coefficient to a median value of the extracted magnitude values.

According to the present invention, the knock determination level is calculated by adding the product of the standard deviation in the extracted magnitude value and the predetermined coefficient to the median value in the extracted magnitude value. In this way, it is possible to obtain the knock determination level on which the magnitude value in the past ignition cycle is reflected. Therefore, it is possible to obtain the knock determination level in consideration of influences of the operation state and individual specificity of the internal combustion engine on the magnitude value. The knocking occurrence state is determined based on the result of comparing the knock determination level and the extracted magnitude values. Therefore, it is possible to determine the knocking occurrence state with high accuracy corresponding to the operating state of the internal combustion engine and individual differences.

It is more preferable that the predetermined coefficient be 3.

According to the present invention, the knock determination level is calculated based on the product of the standard deviation calculated from the extracted magnitude value and the coefficient "3". Considering from data obtained through experiments and knowledge, magnitude values larger than the knock determination level calculated from the coefficient multiplied by the standard deviation being "3" are said to be magnitude values in the ignition cycle in which knocking has occurred actually. Therefore, by calculating the knock determination level based on the product of the standard deviation calculated from the extracted magnitude value and the coefficient "3", it is possible to determine the knocking occurrence state with high accuracy.

It is more preferable that the level calculating portion calculate the knock determination level by adding the product of the standard deviation in magnitude values of not more than the smallest magnitude value among magnitude values in which the extracted frequency shows a peak and a predetermined coefficient, to the smallest magnitude value among the magnitude values where the extracted frequency shows the peak.

According to the present invention, the product of the standard deviation in magnitude values of not more than the smallest magnitude value among magnitude values in which the extracted frequency shows a peak and a predetermined coefficient is added to the smallest magnitude value among the magnitude values where the extracted frequency shows the peak, and the knock determination level is calculated. Here, in the frequency distribution of magnitude values, the smallest magnitude value among the magnitude values where the extracted frequency shows the peak is often the almost same value irrespective or presence or non-presence of a magnitude value of vibration of a noise component. Thereby, even if the magnitude values detected by the effect of noise components (extracted magnitude values) become high, it is possible to suppress the knock determination level calculated becoming high beyond necessity. Consequently, it is possible to determine the knocking occurrence state with high accuracy.

It is more preferable that the predetermined coefficient be 3.

According to the present invention, the knock determination level is calculated based on the product of the standard deviation calculated from the extracted magnitude value and the coefficient "3". Considering from data obtained through experiments and knowledge, magnitude values larger than the knock determination level calculated from the coefficient multiplied by the standard deviation being "3" are said to be magnitude values in the ignition cycle in which knocking has occurred actually. Therefore, by calculating the knock determination level based on the product of the standard deviation calculated from the extracted magnitude value and the coefficient "3", it is possible to determine the knocking occurrence state with high accuracy.

It is more preferable that the level calculating portion calculate the knock determination level by adding the product of a standard deviation in magnitude values of not more than a smallest magnitude value among magnitude values which are magnitude values in which the extracted frequency is higher than predetermined frequency and the extracted frequency shows a peak and a predetermined coefficient, to the smallest magnitude value among the magnitude values in which the extracted frequency is higher than the predetermined frequency and the extracted frequency shows the peak.

According to the present invention, the product of a standard deviation in magnitude values of not more than the smallest magnitude value among magnitude values which are magnitude values in which the extracted frequency is higher than the predetermined frequency and the extracted frequency shows a peak and a predetermined coefficient is added to the smallest magnitude value among the magnitude values in which the extracted frequency is higher than the predetermined frequency and the extracted frequency shows the peak, and the knock determination level is calculated. Here, in the frequency distribution of magnitude values, the smallest magnitude value among the magnitude values where the extracted frequency shows the peak is often the almost same value irrespective of presence or non-presence of magnitude values of vibration of noise components. However, depending on the vibration occurrence state in the internal combustion engine, dispersion of extracted magnitude values becomes large, so there is a case where a peak is shown at lower frequency than usual in lower magnitude values than usual. In view of this, the knock determination level is calculated by using the smallest magnitude value, as a reference, among magnitude values that the extracted frequency is higher than the predetermined frequency and the extracted frequency shows a peak. Thereby, even if the magnitude values detected due to the effects of noise components (extracted magnitude value) become high, it is possible to suppress the knock determination level calculated becoming high beyond necessity. Further, even if the dispersion of extracted magnitude values becomes large, it is possible to suppress the knock determination level calculated becoming low beyond necessity. Consequently, it is possible to determine the knocking occurrence state with high accuracy.

It is more preferable that the predetermined coefficient be 3.

According to the present invention, the knock determination level is calculated based on the product of the standard deviation calculated from the extracted magnitude value and the coefficient "3". Considering from data obtained through experiments and knowledge, magnitude values larger than the knock determination level calculated from the coefficient multiplied by the standard deviation being "3" are said to be magnitude values in the ignition cycle in which knocking has occurred actually. Therefore, by calculating the knock determination level based on the product of the standard deviation calculated from the extracted magnitude values and the coefficient "3", it is possible to determine the knocking occurrence state with high accuracy.

It is more preferable that the waveform of vibration be a waveform in which waveforms of vibration of a plurality of frequency bands caused in the internal combustion engine are synthesized.

According to the present invention, waveforms of vibration of a plurality of frequency bands caused in the internal combustion engine are synthesized. Thereby, it is possible to obtain a waveform using for knocking determination by synthesizing waveforms of vibration of frequency bands particular at the time of knocking. Therefore, a waveform in which waveforms of vibration of noise components are suppressed can be obtained. Consequently, it is possible to determine the knocking occurrence state with high accuracy while suppressing effects of vibration of noise components.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a chart showing a waveform of the vibration in the engine.

DESCRIPTION OF THE PREFERRED EMBODIMENTS

Figure 1:
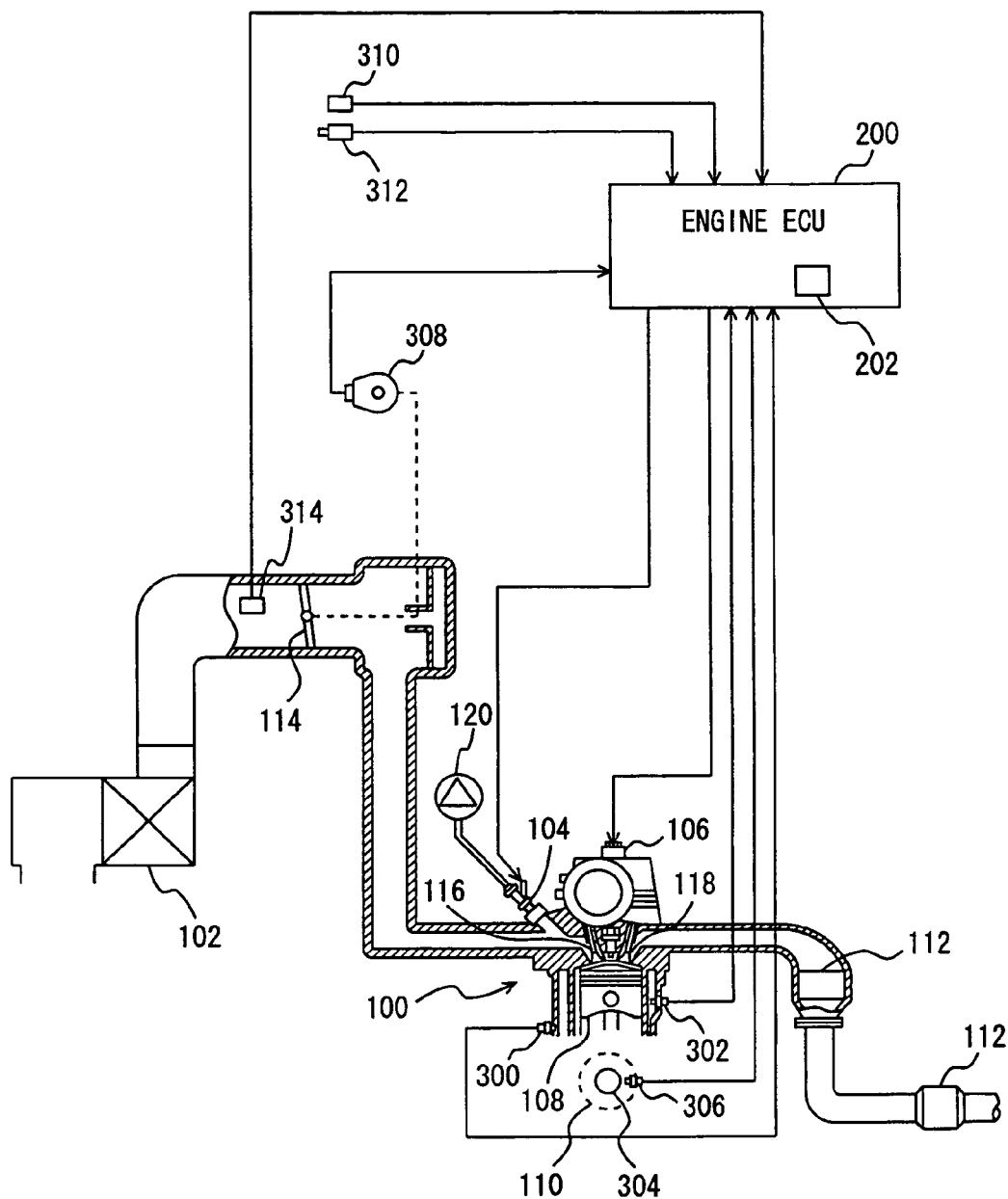
FIG. 1 is a schematic configuration diagram showing an engine controlled by an engine ECU which is a knocking state determination device according to a first embodiment of the present invention.

Embodiments of the present invention will be described below with reference to the drawings. In the following description, the same parts are provided with the same reference numerals. They have the same names and functions. Therefore, detailed description of the same parts is not repeated.

First Embodiment

With reference to FIG. 1, an engine 100 of a vehicle mounting a knocking state determination device according to a first embodiment of the present invention will be described. The knocking state determination device according to the present embodiment is realized by a program executed by an engine ECU (Electronic Control Unit) 200 for example.

Engine 100 is an internal combustion engine in which an air-fuel mixture of air drawn in from an air cleaner 102 and fuel injected from an injector 104 is ignited by a spark plug 106 and burnt in a combustion chamber.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 performs computation based on signals sent from the respective sensors and ignition switch 312 and a map and the program stored in memory 202 and controls the devices so as to bring engine 100 into a desired operation state.

In the present embodiment, engine ECU 200 detects a waveform of vibration (hereafter referred to as "vibration waveform") of engine 100 in a knock detection gate (a section between a predetermined first crank angle and a predetermined second crank angle) based on the signal and the crank angle sent from knock sensor 300 and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
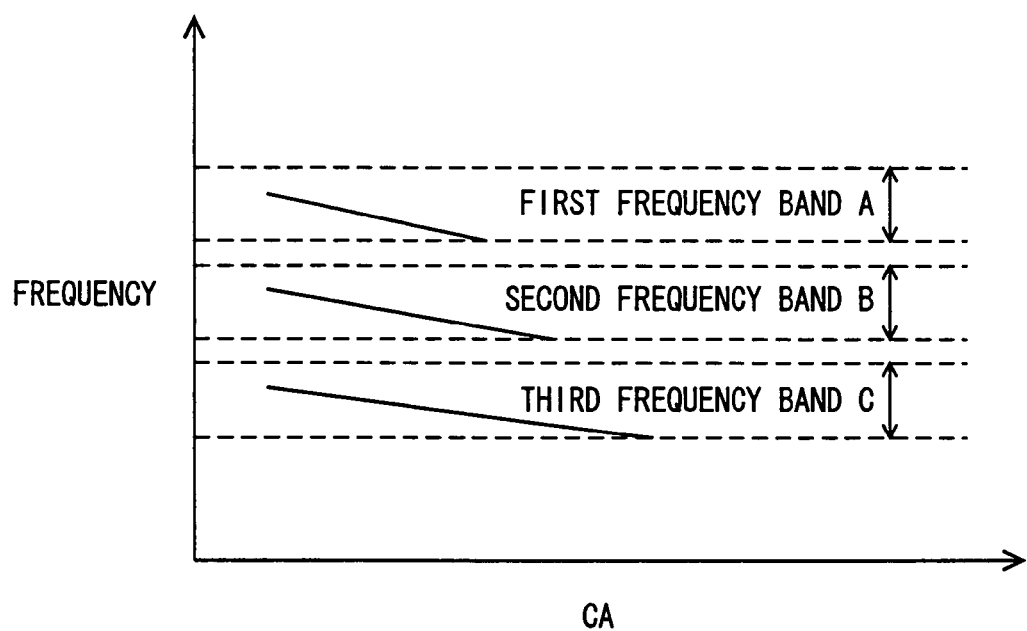
FIG. 2 is a chart showing a frequency band of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
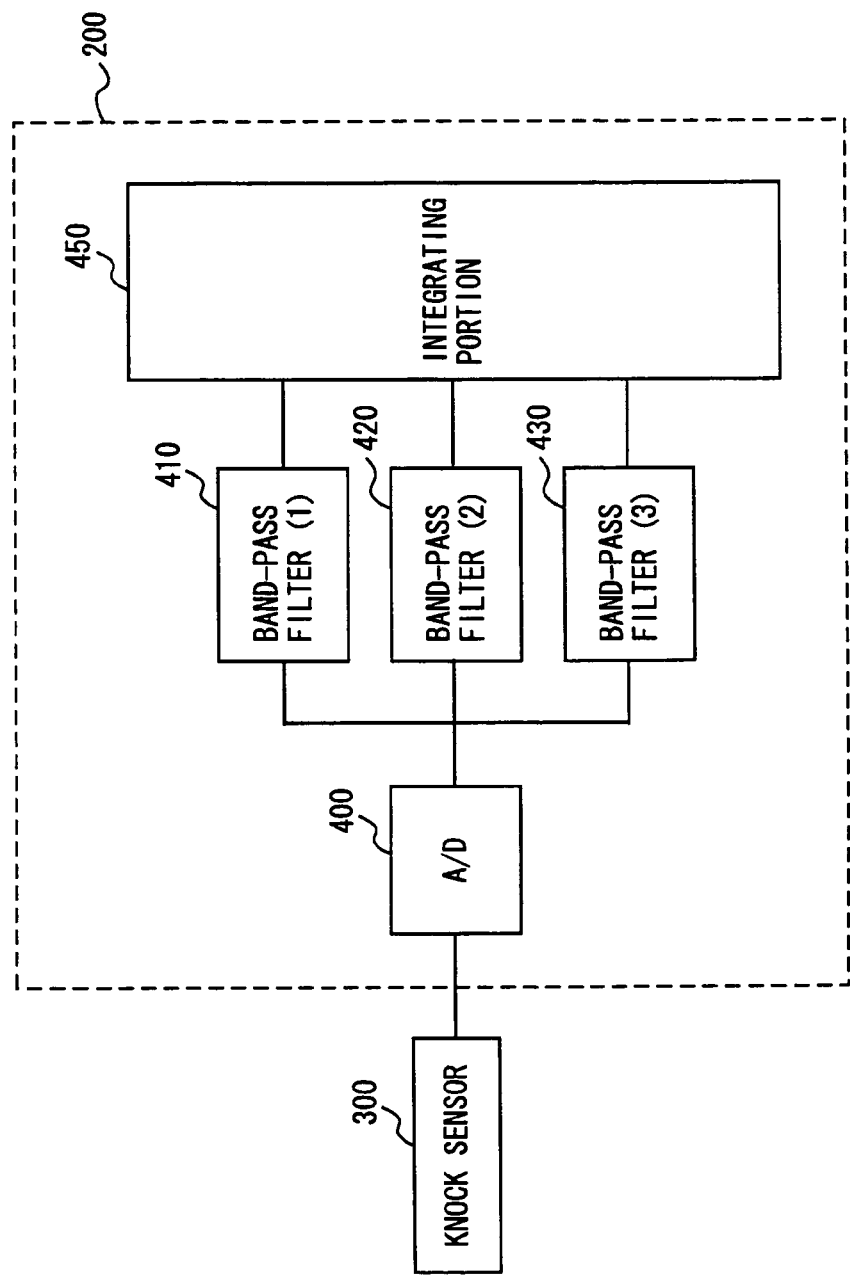
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

As a result, as shown in FIG. 4, a vibration waveform of engine 100 is detected. In other words, the synthesized waveform of the first to third frequency bands A to C are used as the vibration waveform of engine 100.

Figure 5:
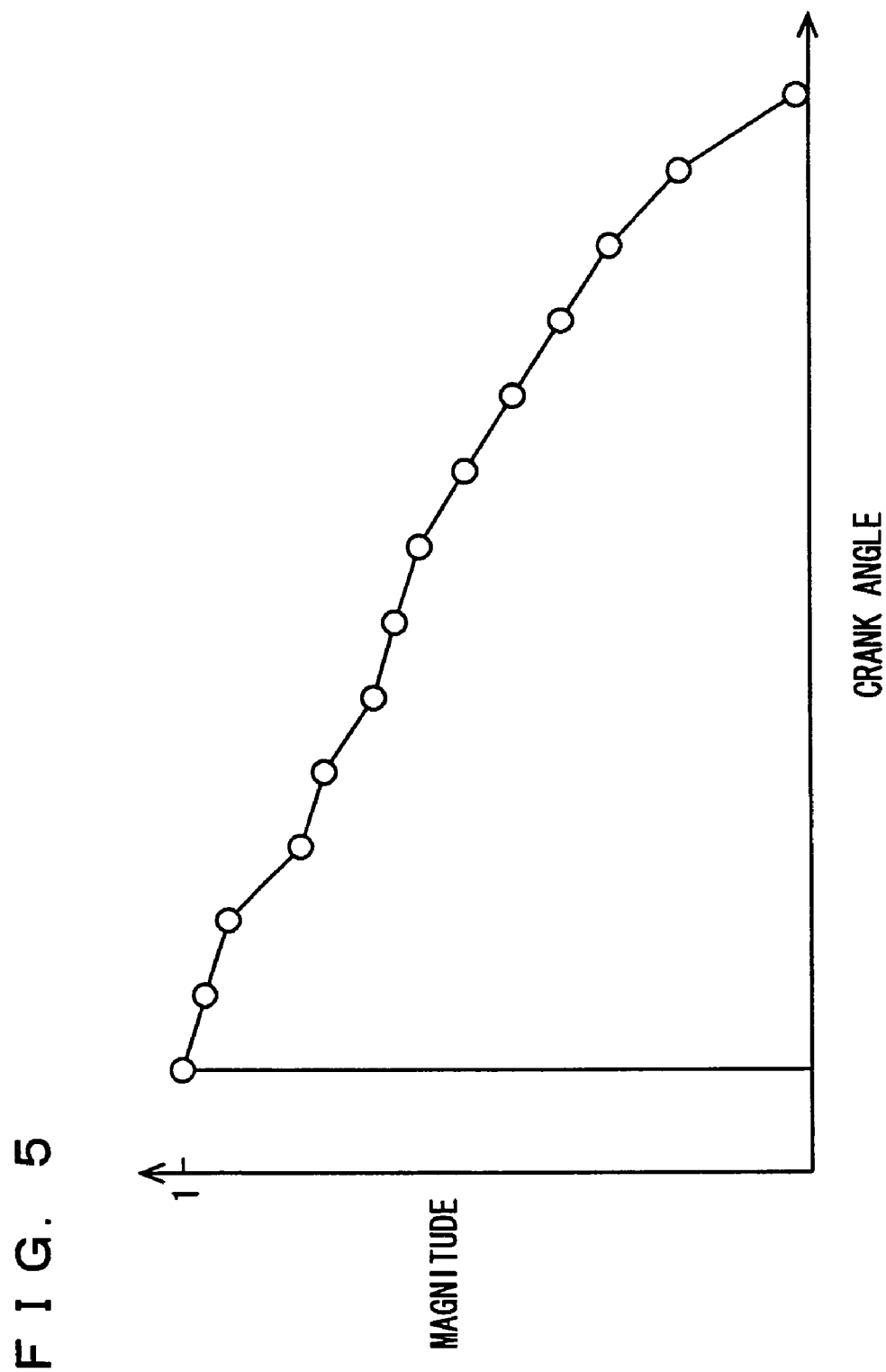
FIG. 5 is a chart showing a knock waveform model stored in memory of the engine ECU.

The detected vibration waveform is compared with a knock waveform model stored in memory 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine.

A method of forming the knock waveform model is not limited to it and it is also possible to form the model by simulation. Engine ECU 200 compares the detected waveform and the stored knock waveform model with each other and determines whether or not the knocking has occurred in engine 100.

Figure 6:
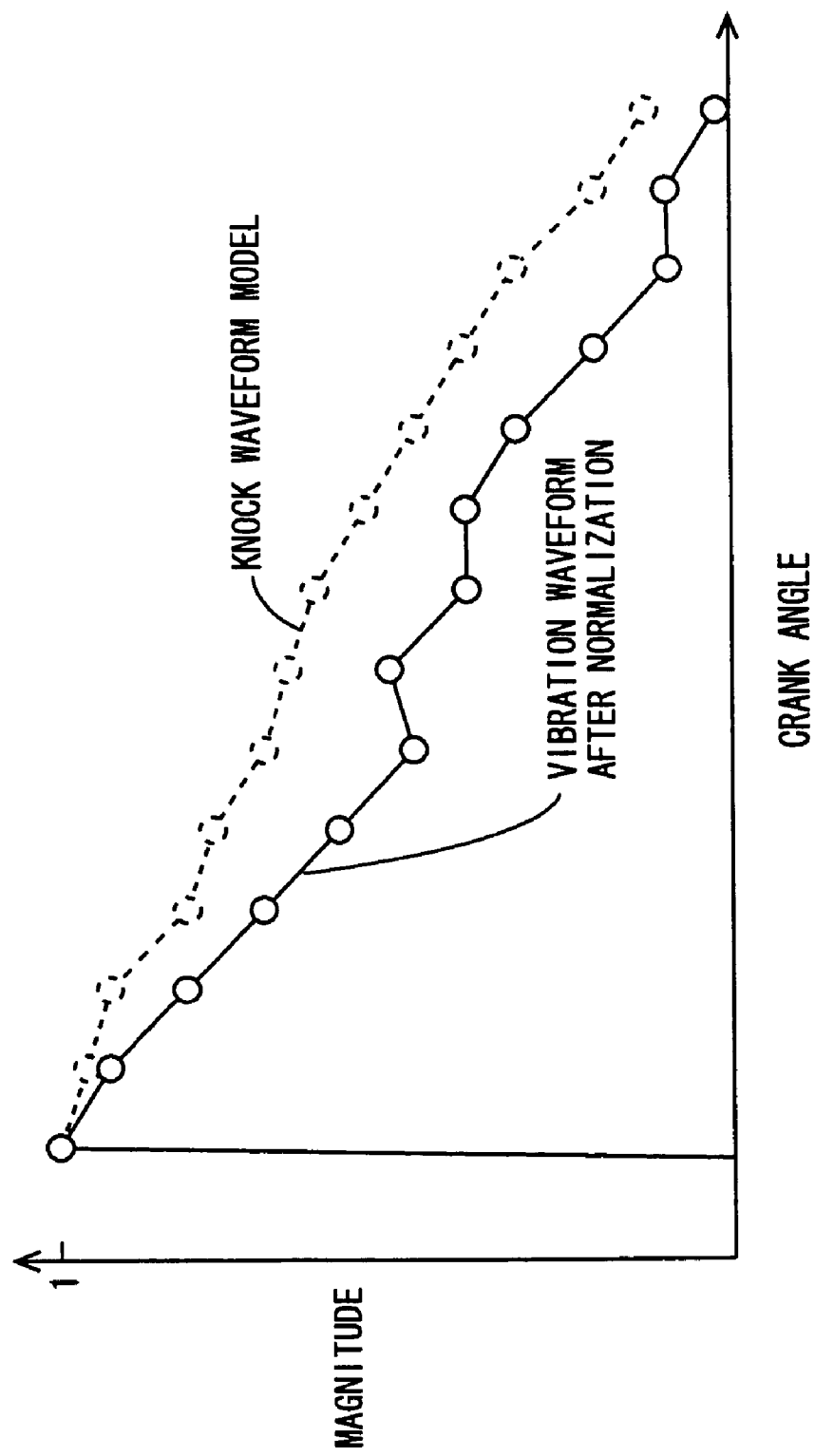
FIG. 6 is a chart for comparing the vibration waveform and the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at every 5° of crank angle to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of the vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on correlation coefficient K and the maximum value (peak value) of the integrated value. If the maximum value of the integrated value is P and a value representing the magnitude of engine 100 when the knocking is not generated in engine 100 is BGL (Back Ground Level), knock magnitude N is calculated by an equation, $N=P\times K/BGL$. BGL is stored in memory 202. A method of calculating knock magnitude N is not limited to it.

Figure 7:
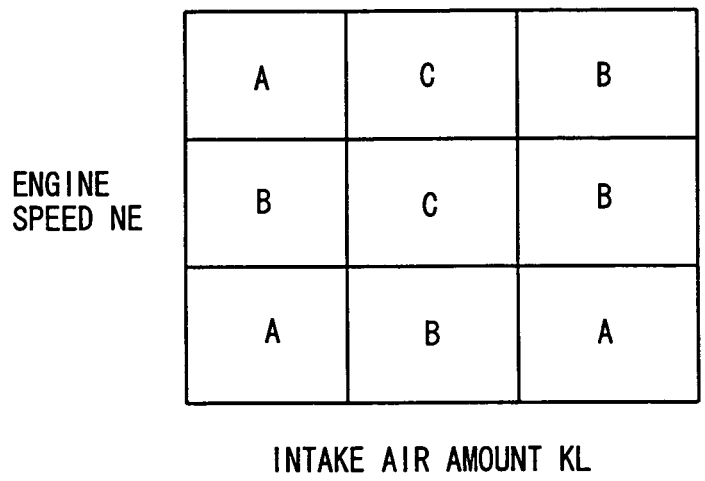
FIG. 7 is a chart showing a map of a determination value V(KX) stored in the memory of the engine ECU.

In the embodiment, engine ECU 200 compares calculated knock magnitude N and a determination value V(KX) stored in memory 202 to thereby determine whether or not knocking has occurred in engine 100 for every ignition cycle. As show in FIG. 7, determination values V(KX) are stored as a map using an engine speed NE and an intake air amount KL as parameters.

As an initial value of determination value V(KX), a value determined in advance by experiment or the like is used. However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Figure 8:
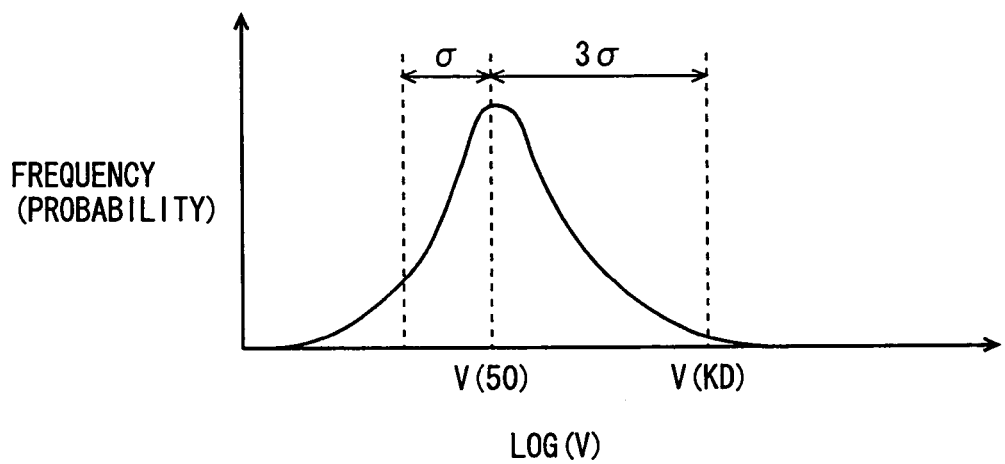
FIG. 8 is a chart (No. 1) showing frequency distribution of magnitude values LOG(V).

Therefore, in the embodiment, as shown in FIG. 8, each determination value V(KX) is corrected by using frequency distribution representing a relationship between a magnitude value LOG(V) which is a value obtained by logarithmically converting magnitudes V for the predetermined number of ignition cycles (e.g., 200 cycles) and a frequency (the number of times, a probability) of detection of each magnitude value LOG(V).

The frequency distribution of magnitude values (LOG)(V) is formed for each range in which engine speed NE and the intake air amount KL are used as parameters and corresponding determination value V(KX) is corrected. Magnitude V used for calculating magnitude value LOG(V) is a peak value (peak value of integrated values at every 5°) of magnitudes between predetermined crank angles.

In the frequency distribution, median value V(50) at which the accumulative sum of frequencies of magnitudes LOG(V) from the minimum value reaches 50% is calculated. Furthermore, standard deviations σ at magnitude values LOG(V) equal to or smaller than median value V(50) are calculated. A value obtained by adding the product of a coefficient U (U is a constant and U=3, for example) and standard deviation σ to median value V(50) is a knock determination level V(KD). Frequency of magnitude values LOG(V) larger than the knock determination level V(KD) is determined as frequency that knocking occurred.

Note that coefficient U is a coefficient calculated from data obtained through experiments or the like and knowledge. The magnitude value LOG(V) larger than the knock determination level V(KD) where U=3 almost coincides with the magnitude value LOG(V) in an ignition cycle in which knocking occurred actually. Note that a value other than "3" may be used for coefficient U.

Figure 9:
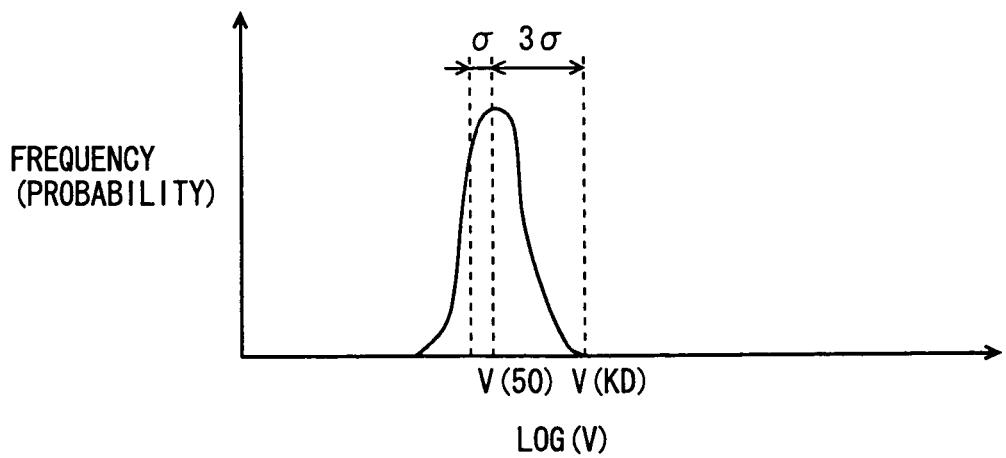
FIG. 9 is a chart (No. 2) showing frequency distribution of magnitude values LOG(V).

In the frequency distribution of magnitude values LOG(V), as shown in FIG. 9, if magnitude values LOG(V) of vibrations which are noise components are mixed in magnitude values LOG(V), a frequency with which large magnitude values LOG(V) are calculated becomes high and the frequency distribution becomes biased in shape. In this case, a range of distribution (a difference between the minimum value and the maximum value) of magnitude values LOG(V) may become narrow and magnitude values LOG(V) greater than knock determination level V(KD) may become extremely few in some cases. As a result, there is a fear that the number of times that knocking has occurred cannot be determined accurately.

Figure 10:
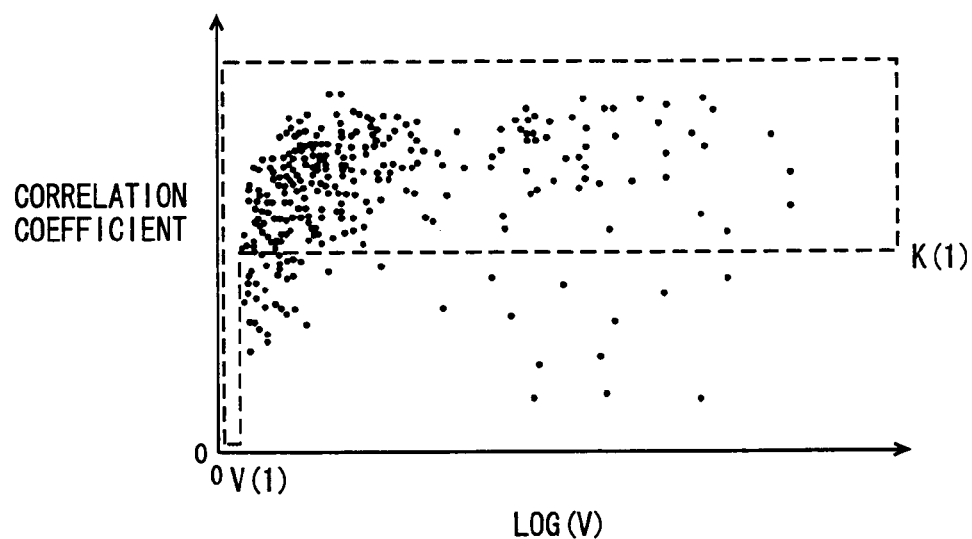
FIG. 10 is a chart showing magnitude values LOG(V) used for forming the frequency distribution of the magnitude values LOG(V).

Therefore, in the embodiment, as magnitude values LOG(V) used for forming the frequency distribution, magnitude values LOG(V) in a range surrounded with a broken line in FIG. 10 are used. FIG. 10 is a chart in which calculated magnitude values LOG(V) are plotted for each correlation coefficient K in a cycle in which magnitude values LOG(V) are obtained.

As shown in FIG. 10, the frequency distribution is formed after excluding magnitude values LOG(V) greater than a threshold value V(1) and calculated in ignition cycles in which correlation coefficient K is smaller than a threshold value K(1). In other words, magnitude values LOG(V) satisfying a condition that they are smaller than threshold value V(1) and magnitude values LOG(V) calculated in the ignition cycles in which correlation coefficients K satisfying a condition that they are greater than threshold value K(1) are extracted to form the frequency distribution.

Figure 11:
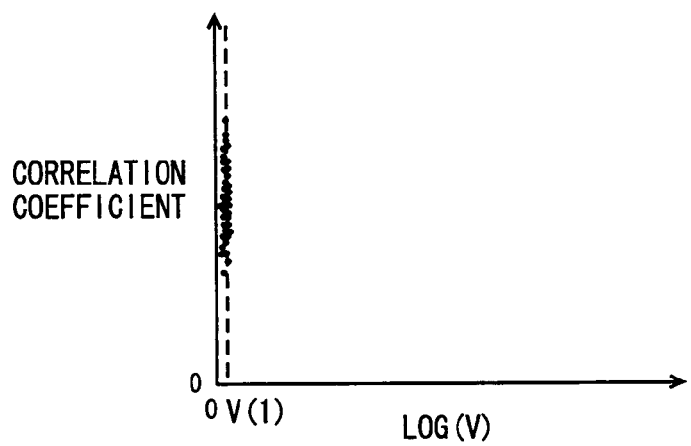
FIG. 11 is a chart showing magnitude values LOG(V) in setting a threshold value V(1).

With reference to FIG. 11, threshold value V(1) will be further described. FIG. 11 shows magnitude values LOG(V) when engine 100 is operated so that magnitudes V of vibrations due to factors (noise components) other than knocking are not taken in when magnitudes V used for calculating magnitude values LOG(V) are detected.

As the vibrations due to the noise components, vibrations due to piston slap, vibrations due to actuation of an injector 104 (and especially a direct injector), vibrations due to seating of an intake valve 116 or an exhaust valve 118, and the like are conceivable.

In the gate (between predetermined crank angles) for taking in magnitudes V, engine 100 is operated so that the piston slap does not occur and engine 100 is operated so that injector 104, intake valve 116, and exhaust valve 118 are stopped to thereby calculate magnitude values LOG(V) shown in FIG. 11.

A median value of magnitude values LOG(V) calculated in this manner is set as threshold value V(1). The median value is set as threshold value V(1) because magnitude values of the vibrations due to the noise components are considered to be greater than the median value. It is also possible to set a value (e.g., a value smaller than the median value) other than the median value as threshold value V(1).

Figure 12:
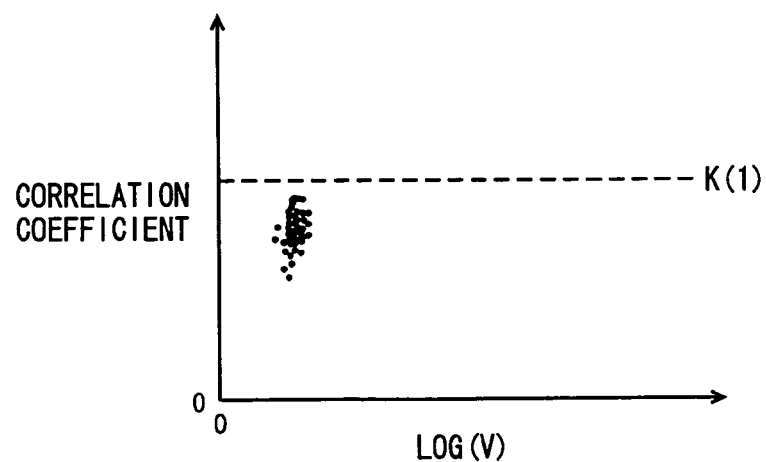
FIG. 12 is a chart showing magnitude values LOG(V) in setting a threshold value K(1).

With reference to FIG. 12, threshold value K(1) will be further described. FIG. 12 shows magnitude values LOG(V) when engine 100 is operated so that a noise waveform is included in vibration waveform in the ignition cycle in which magnitude values LOG(V) are calculated.

In the knock detection gate, engine 100 is operated so that the piston slap occurs and engine 100 is operated so that injector 104, intake valve 116, and exhaust valve 118 are actuated to thereby calculate magnitude values LOG(V) shown in FIG. 12.

A maximum value of correlation coefficients K in magnitude values LOG(V) calculated in this manner is set as threshold value K(1). It is also possible to set a value (e.g., a value greater than the maximum value) other than the maximum value as threshold value K(1).

Thus, by using magnitude values LOG(V) smaller than threshold value V(1) and magnitude values LOG(V) in the ignition cycle in which correlation coefficient K is greater than threshold value K(1), the frequency distribution is formed. In other words, while excluding magnitude values LOG(V) which are considered to be magnitude values LOG(V) of the vibrations of the noise components, the frequency distribution is formed.

Figure 13:
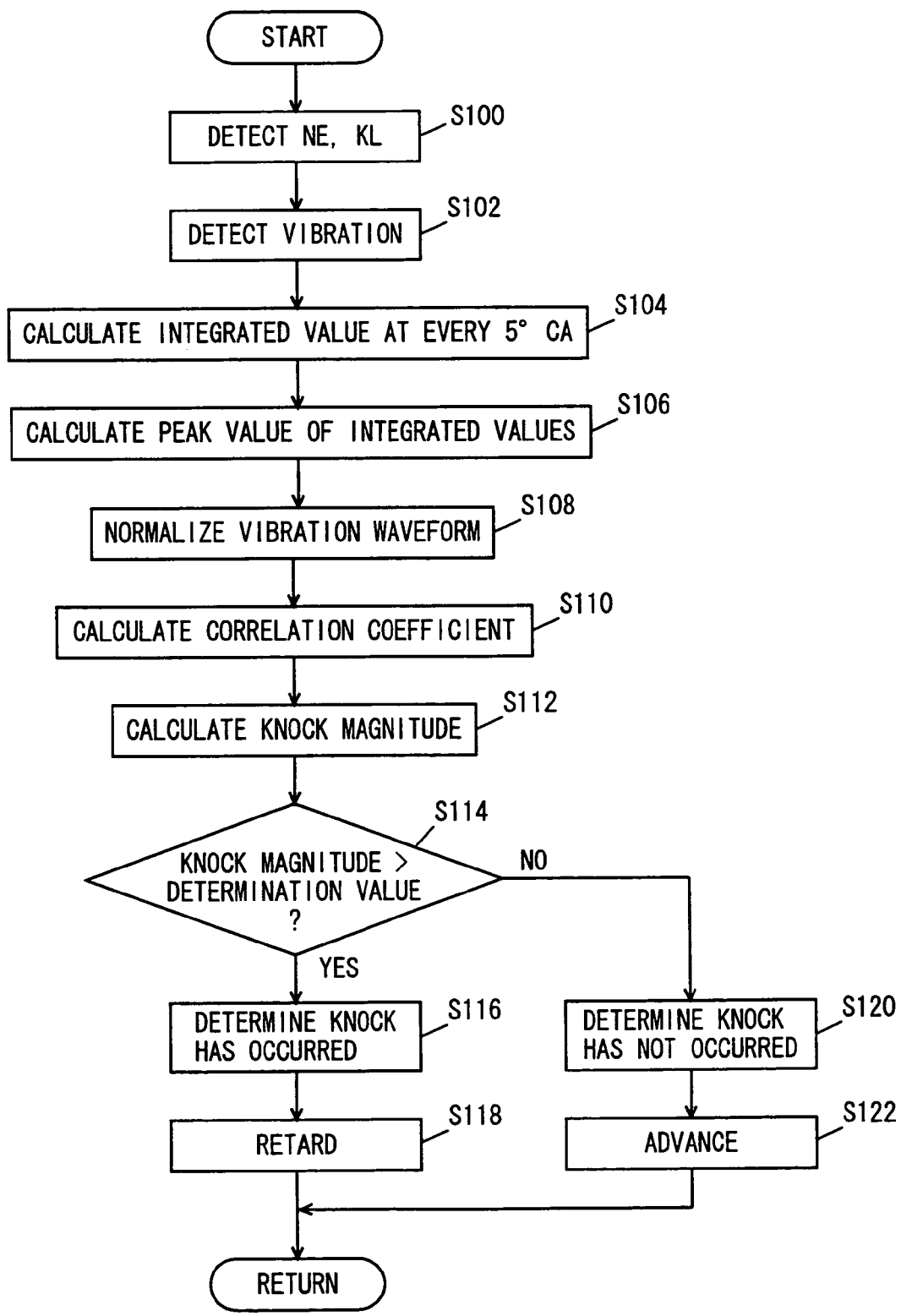
FIG. 13 is a flowchart (No. 1) showing a control structure of the program executed by the engine ECU in FIG. 1.

With reference to FIG. 13, description will be given for the control structure of a program executed for determining whether knocking occurred for each ignition cycle by engine ECU 200 which is the knocking state determination device according to the present embodiment.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other.

In S112, engine ECU 200 calculates the knock magnitude N. If the calculated peak value is P and a value representing the magnitude of the vibration of engine 100 when the knocking is not generated in engine 100 is BGL (Back Ground Level), knock magnitude N is calculated by an equation, N=P×K/BGL. BGL is stored in memory 202. A method of calculating knock magnitude N is not limited to it.

In S114, engine ECU 200 determines whether or not knock magnitude N is greater than the predetermined determination value. If knock magnitude N is greater than the predetermined determination value (YES in S114), the processing moves to S116. Otherwise (NO in S114), the processing moves to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 14:
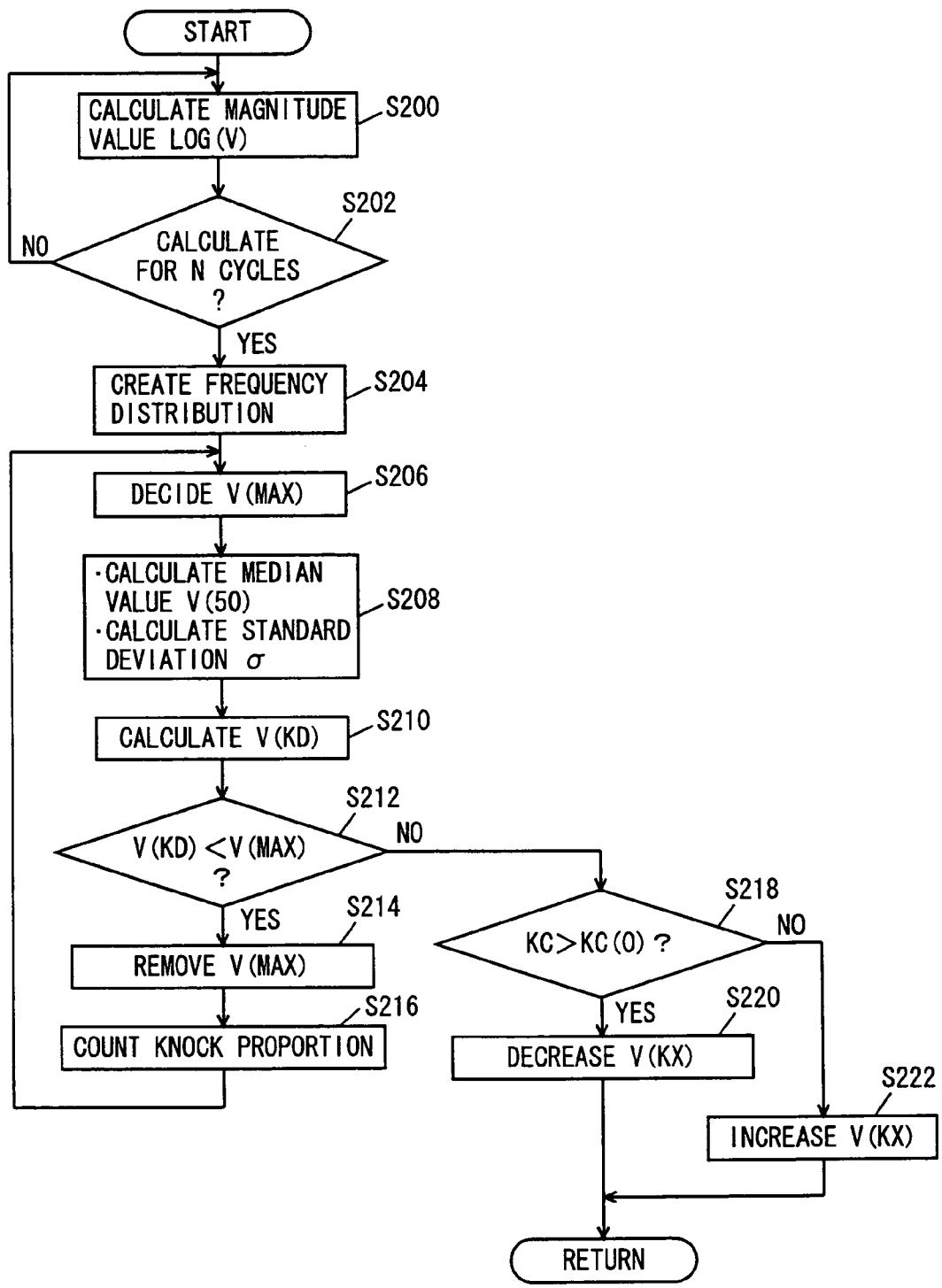
FIG. 14 is a flowchart (No. 2) showing the control structure of the program executed by the engine ECU in FIG. 1.

With reference to FIG. 14, description will be given for the control structure of a program executed for correcting the determination value V(KX) for determining whether knocking occurred for each ignition cycle, by engine ECU 200 which is the knocking state determination device according to the present embodiment.

In S200, engine ECU 200 calculates magnitude value LOG(V) from magnitude V detected based on the signal sent from knock sensor 300. Here, magnitude V is a peak value (peak value of integrated values at every 5°) between predetermined crank angles.

In S202, engine ECU 200 determines whether or not magnitude values LOG(V) for N cycles (N is a natural number and N=200, for example) have been calculated. Engine ECU 200 determines that magnitude values LOG(V) for N cycles have been calculated when N or more magnitude values LOG(V) in the above-described range surrounded with a broken line in FIG. 10 have been calculated. If magnitude values LOG(V) for N cycles are calculated (YES in S202), the processing moves to S204. Otherwise (NO in S202), the processing returns to S200.

In S204, engine ECU 200 forms frequency distribution of magnitude values LOG(V). In S206, engine ECU 200 determines a maximum value V(MAX) of magnitude values LOG(V).

In S208, engine ECU 200 calculates a median value V(50) and a standard deviation σ of magnitude values LOG(V) equal to or smaller than maximum value V(MAX). In S210, engine ECU 200 calculates knock determination level V(KD) based on median value V(50) and standard deviation σ.

In S212, engine ECU 200 determines whether or not knock determination level V(KD) is smaller than maximum value V(MAX). If knock determination level V(KD) is smaller than maximum value V(MAX) (YES in S212), the processing moves to S214. Otherwise (NO in S212), the processing moves to S218.

In S214, engine ECU 200 removes V(MAX) determined in S206 from the frequency distribution. In S216, engine ECU 200 counts the sum of the frequency of the removed maximum values V(MAX) as knock proportion KC. Then, the processing returns to S206.

In S218, engine ECU 200 determines whether or not knock proportion KC is greater than a threshold value KC(0). If knock proportion KC is greater than threshold value KC(0) (YES in S218), the processing moves to S220. Otherwise (NO in S218), the processing moves to S222. In S220, engine ECU 200 decreases determination value V(KX). In S222, engine ECU 200 increases determination value V(KX).

Description will be given for operation of engine ECU 200 which is the knocking state determination device according to the present embodiment, based on the structure and the flowchart described above.

When a driver turns ignition switch 312 on to start engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degree is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value ΔS (I) of the deviation of the vibration waveform after the normalization and the knock waveform model from each other at each crank angle is calculated. Based on the total of ΔS(I) and value S obtained by integrating the magnitude of the vibration in the knock waveform model by the crank angle, correlation coefficient K is calculated by K=(S−ΣΔS(I))/S (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

By dividing the product of correlation coefficient K calculated as described above and peak value P by BGL, knock magnitude N is calculated (S112). In this manner, it is possible to more closely analyze whether or not the vibration of engine 100 is a vibration caused by knocking based on the magnitude of the vibration in addition to the degree of agreement between the detected vibration waveform and the knock waveform model.

When knock magnitude N is greater than the predetermined determination value (YES in S114), it is determined that knocking has occurred (S116) and the ignition timing is retarded (S118). As a result, occurrence of knocking is suppressed.

On the other hand, when knock magnitude N is not greater than the predetermined determination value (NO in S114), it is determined that knocking has not occurred (S120) and the ignition timing is advanced (S122).

In this way, by comparing knock magnitude N and determination value V(KX) with each other, it is determined whether or not knocking has occurred in each ignition cycle and the ignition timing is retarded or advanced.

As described above, even when the same vibrations occur in engine 100, detected magnitudes may be different due to variation in the output value and degradation of knock sensor 300. In this case, it is necessary to correct determination value V(KX) and to determine whether or not knocking has occurred by using determination value V(KX) corresponding to the actually-detected magnitude.

Therefore, the magnitude value LOG(V) is calculated from the magnitude V detected based on a signal transmitted from knock sensor 300 (S200).

When the magnitude values LOG(V) for N cycles are calculated (YES in S202), frequency distribution of the calculated magnitude values LOG(V) is prepared (S204), and the maximum value V(MAX) of the magnitude values LOG(V) in the frequency distribution is decided (S206). Further, the median value V(50) and the standard deviation σ in the frequency distribution of the magnitude values LOG(V) not more than the maximum value V(MAX) are calculated (S208), and based on the median value V(50) and the standard deviation σ, the knock determination level V(KD) is calculated (S210).

Figure 15:
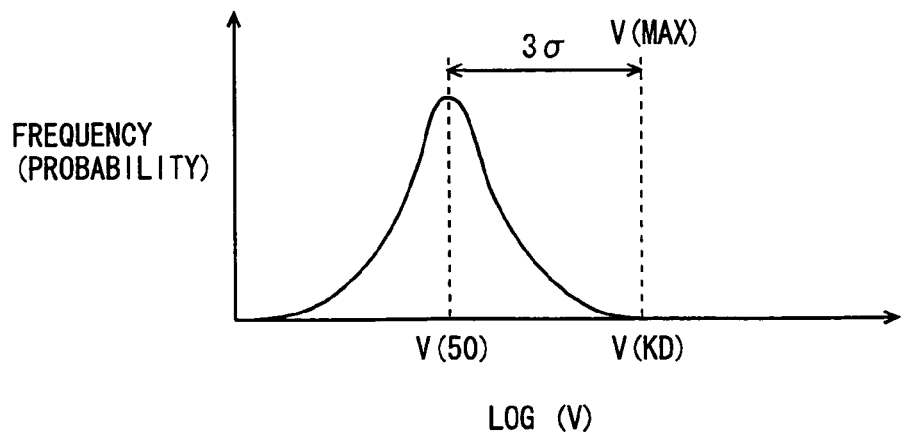
FIG. 15 is a chart (No. 3) showing frequency distribution of magnitude values LOG(V).
Figure 16:
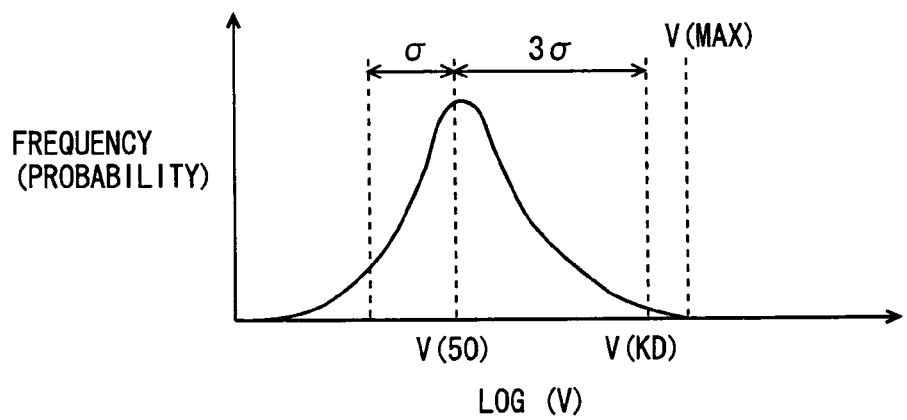
FIG. 16 is a chart (No. 4) showing frequency distribution of magnitude values LOG(V).

If knocking did not occur in the engine 100, the frequency distribution becomes normal distribution as shown in FIG. 15, and the maximum value V(MAX) and the knock determination level V(KD) coincide with each other. On the other hand, when knocking occurred, the magnitude V detected becomes larger, and when a large magnitude value LOG(V) is calculated, the maximum value V(MAX) becomes larger than the knock determination level V(KD), as shown in FIG. 16.

Figure 17:
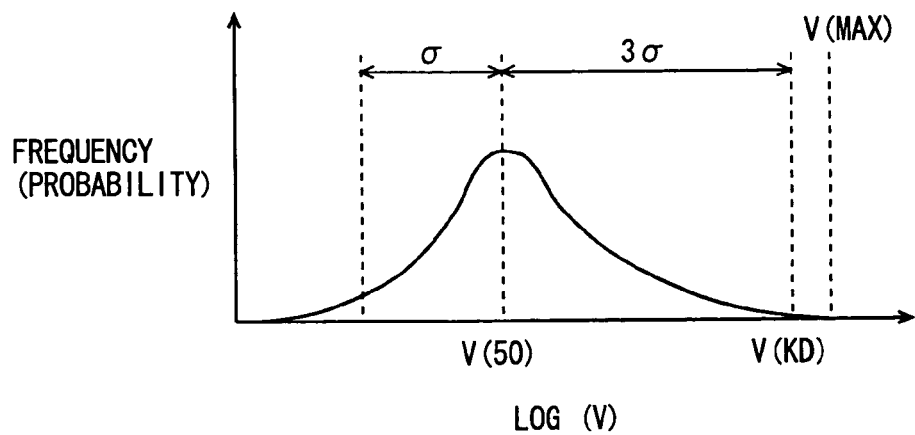
FIG. 17 is a chart (No. 5) showing frequency distribution of magnitude values LOG(V).
Figure 18:
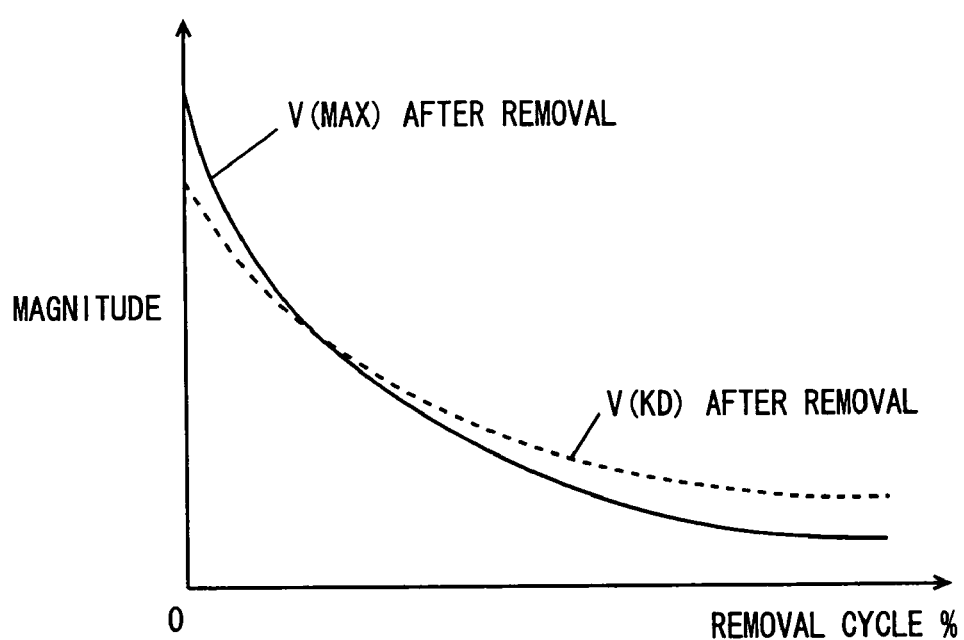
FIG. 18 is a chart showing progressions of V(KD) and V(MAX)

Further, if the frequency of occurrence of knocking increases or mechanical vibration of the engine 100 itself increases, the maximum value V(MAX) becomes much larger as shown in FIG. 17. At this time, the median value V(50) and the standard deviation σ increase in accordance with the maximum value V(MAX). Therefore, the knock determination level V(KD) becomes larger.

Magnitude values LOG(V) smaller than the knock determination level V(KD) are not determined as magnitude values LOG(V) in the cycle in which knocking occurred. Therefore, as the knocking determination level V(KD) becomes larger, the frequency that knocking is determined not to occur increases even though knocking occurred.

In order to suppress an increase in the knock determination level V(KD) as described above, if the knock determination level V(KD) is smaller than the maximum value V(MAX) (YES in S212), the maximum value V(MAX) is removed from the frequency distribution (S214). The total of the frequencies of removed maximum values V(MAX) is counted as knock occupancy KC (S216).

In the frequency distribution in which the maximum value V(MAX) has been removed, a maximum value V(MAX) is decided again (S206). That is, the maximum value V(MAX) is corrected to be smaller.

Further, in the frequency distribution after the maximum value V(MAX) has been removed, a knock determination level V(KD) is again calculated (S210). That is, a knock determination level V(KD) in the frequency distribution for magnitude values LOG(V) smaller than the maximum value V(MAX) decided again is calculated again. As long as the knock determination level V(KD) is smaller than the maximum value V(MAX) (YES in S21), processing from S206 to S216 is repeated.

If a knock determination level V(KD) is recalculated after removing maximum values V(MAX), the knock determination level V(KD) becomes larger as the removed number of maximum values V(MAX) increases (as the maximum value V(MAX) in frequency distribution becomes smaller). Since the reduction rate of the maximum value V(MAX) is larger than the reduction rate of knock determination level V(KD), there is a point where the both coincide.

Figure 19:
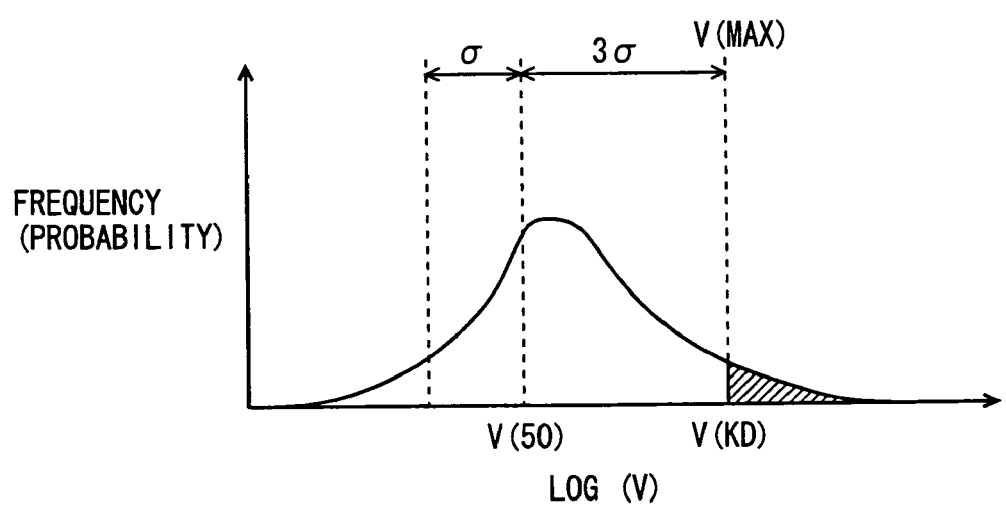
FIG. 19 is a chart (No. 6) showing frequency distribution of magnitude values LOG(V).

As described above, in frequency distribution where knocking is not generated, the maximum value V(MAX) and the knock determination level V(KD) coincide. Therefore, as shown in FIG. 19, in the case where the maximum value V(MAX) and the knock determination level V(KD) coincide (NO in S212), this knock determination level V(KD) is said to simulates a knock determination level V(KD) in frequency distribution where knocking is not generated.

Therefore, the total of frequencies of magnitude values LOG(V) larger than the knock determination level V(KD) (maximum value V(MAX)) in the case that the maximum value V(MAX) and the knock determination level V(KD) coincide, that is, the total of frequencies of maximum values V(MAX) removed until the maximum value V(MAX) and the knock determination level V(KD) coincide, is counted as knock occupancy KC (frequency of knocking being caused) (S216).

Figure 20:
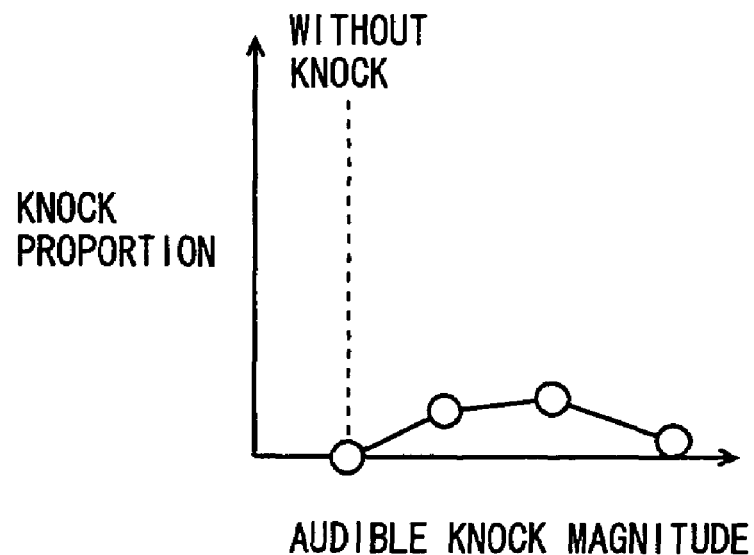
FIG. 20 is a chart (No. 1) showing a relationship between an audible knock magnitude and a knock proportion.
Figure 21:
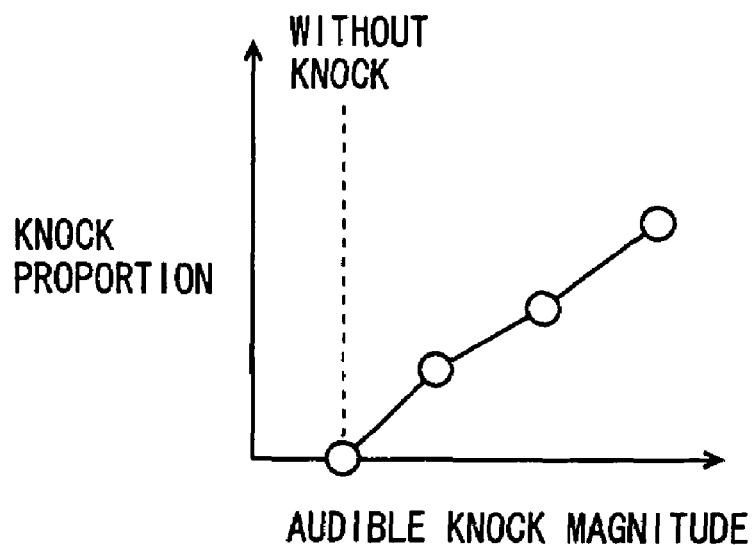
FIG. 21 is a chart (No. 2) showing the relationship between the audible knock magnitude and the knock proportion.

FIG. 20 shows a transition of occupancy KC when the knock occupancy KC is counted by using the knock determination level V(RD) calculated without removing the maximum value V(MAX). In this case, the knock occupancy KC increases as the audible knock magnitude (magnitude level that passengers can sense by listening) increases from the state of no knocking. However, since the knock determination level V(KD) increases as the maximum value V(MAX) increases, if the audible knock magnitude is too large, the knock occupancy decreases in turn.

On the other hand, as shown in FIG. 12, if the knock determination level V(KD) is recalculated by removing maximum values V(MAX) until the maximum value V(MAX) and the knock determination level V(KD) coincide, the knock occupancy KC increases as the audible knock magnitude becomes larger. Thereby, it is possible to detect the knock occupancy with high accuracy.

When the knock occupancy KC is larger than the threshold KC(0) (YES in S218), it is said that knocking occurs at frequency larger than acceptable frequency. In such a case, in order to make determination of knocking being caused to be done easily, the determination value V(KX) is made to be smaller (S220). Thereby, it is possible to increase the frequency that knocking is determined to have occurred, and to retard spark to thereby suppress occurrence of knocking.

On the other hand, if the knock occupancy KC is smaller than the threshold KC(0) (NO in S218), it is said that knocking occurrence frequency is within the allowable value. In this case, it is said that output of the engine 100 can be further increased.

Therefore, the determination value V(KX) is made to be larger (S222). Thereby, frequency that knocking is determined to have occurred is suppressed, and spark is retarded so as to increase output of engine 100.

As described above, the engine ECU which is the knocking state determination device according to the present embodiment creates frequency distribution by using a magnitude value LOG(V) in an ignition cycle in which the correlation coefficient K is larger than the threshold K(1), and determines the knock occupancy KC, that is, the knocking occurrence frequency (number of times). The threshold K(1) is the maximum value of correlation coefficient K calculated in the case where the engine is operated such that vibration waveforms of noise components are included in vibration waveforms in an ignition cycle in which the magnitude value LOG(V) is calculated. Thereby, in the frequency distribution of magnitude values LOG(V), it is possible to suppress magnitude values LOG(V) considered as magnitude values LOG(V) of vibration of noise components. Therefore, by suppressing effects of vibration of noise components, the number that knocking occurred can be determined. As a result, it is possible to determine the number that knocking occurred with high accuracy.

Figure 22:
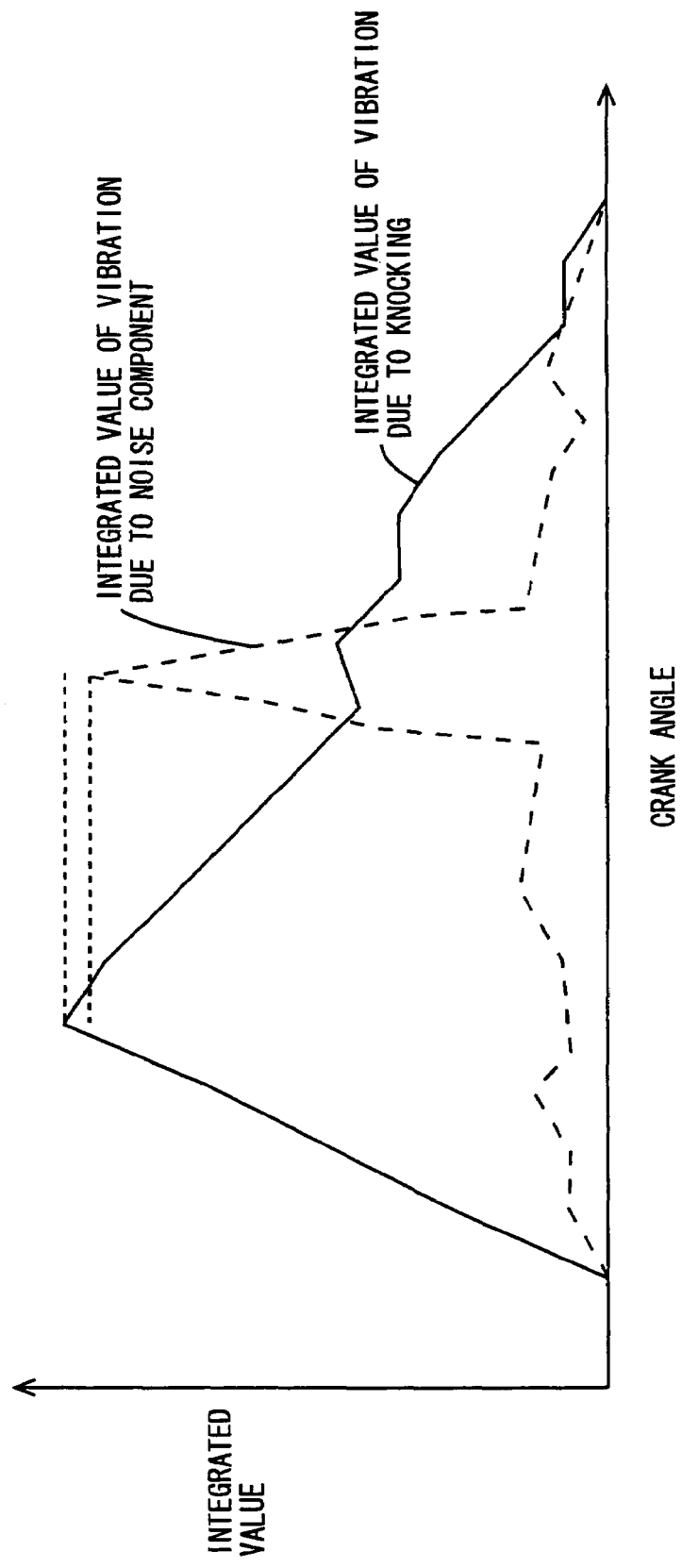
FIG. 22 is a chart (No. 1) showing an integrated value at the time of knocking and an integrated value by noise.
Figure 23:
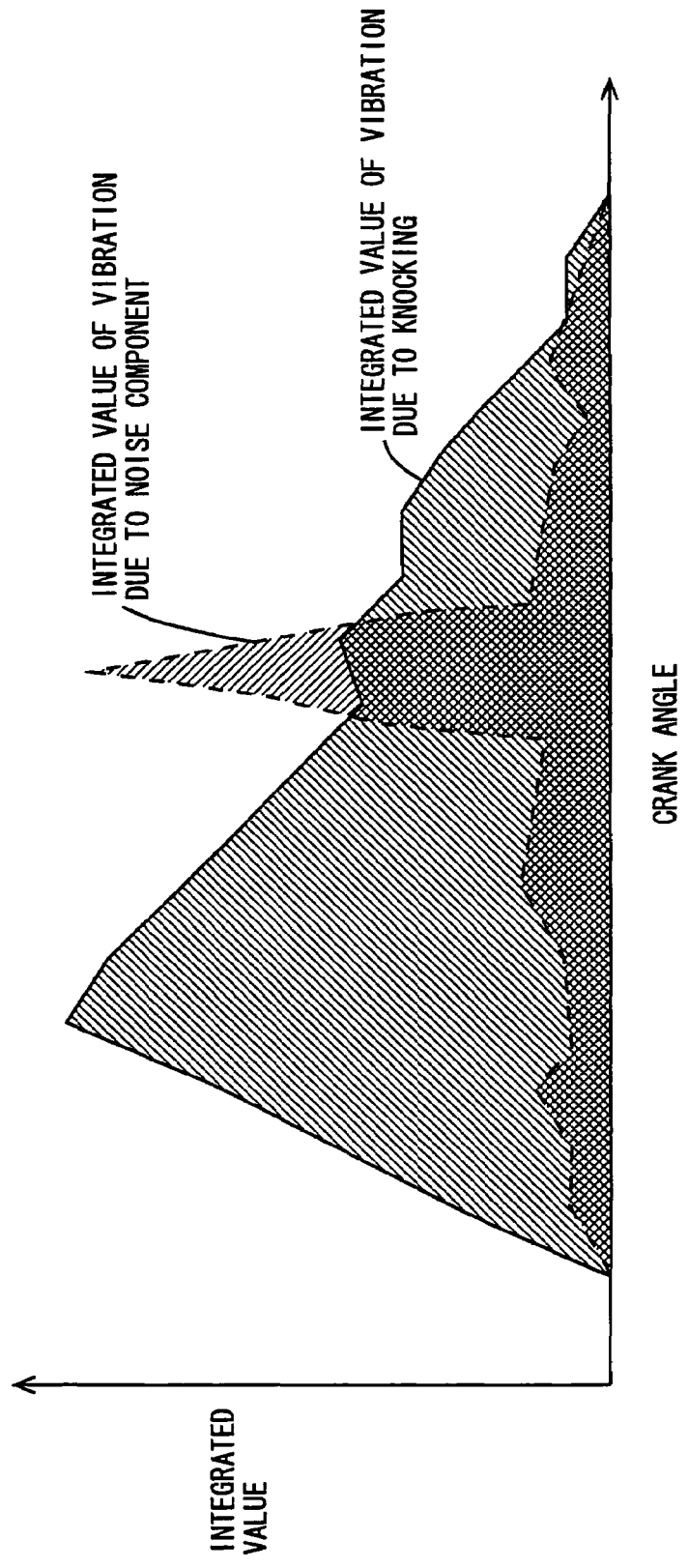
FIG. 23 is a chart (No. 2) showing an integrated value at the time of knocking and an integrated value by noise.

As shown in FIG. 22, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 23, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the product of correlation coefficient K and the sum of the integrated values in the vibration waveform by BGL.

As shown in FIG. 23, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

Second Embodiment

Hereinafter, a second embodiment of the present invention will be described. The present embodiment is different from the first embodiment described above in that the determination value V(KX) is corrected when the frequency that knocking is determined to have occurred is high in knocking determination for each ignition cycle, in addition to frequency distribution of magnitude value LOG(V). Other configurations are same as those of the first embodiment described above, and functions thereof are also same. Therefore, detailed description thereof is not repeated here.

Figure 24:
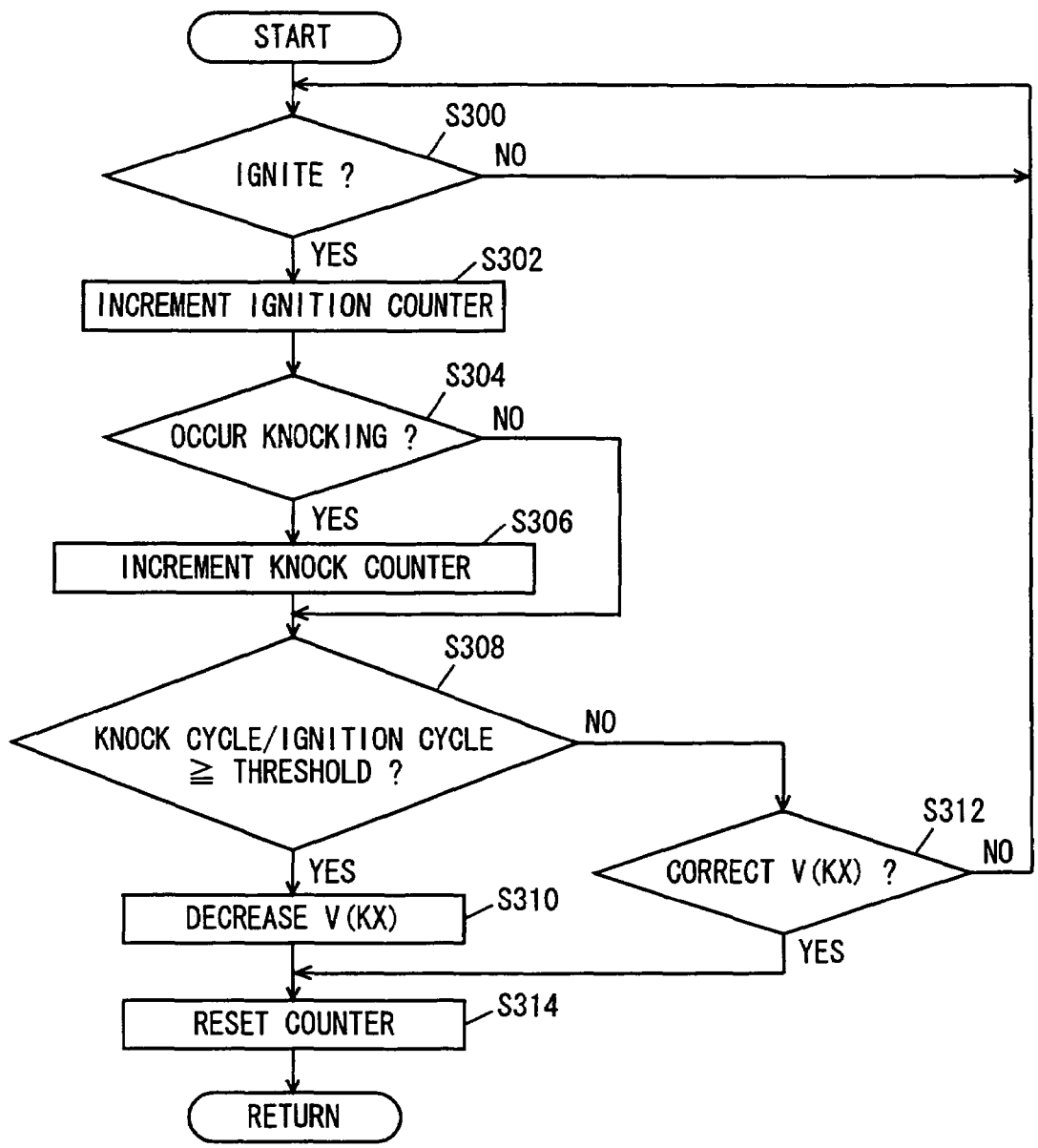
FIG. 24 is a flowchart (No. 3) showing a control structure of a program executed by the engine ECU shown in FIG. 1.

With reference to FIG. 24, a control structure of a program executed by engine ECU 200 which is the knocking state determination device according to the present embodiment will be described. Note that the program described below is executed in addition to the program of the first embodiment described above.

In S300, engine ECU 200 judges whether an air fuel mixture is ignited. Since engine ECU 200 itself has decided whether to ignite an air fuel mixture, whether the air fuel mixture has been ignited is judged inside engine ECU 200. If the air fuel mixture has been ignited (YES in S300), the processing moves to S302. If not (NO is S300), the processing returns to S300. In S302, engine ECU 200 increments the ignition counter.

In S304, engine ECU 200 judges whether knocking is determined to have occurred in the knocking determination of each ignition cycle. If knocking is determined to have occurred (YES in S304), the processing moves to S306. If not (NO in S304), the processing moves to S308. In S306, engine ECU 200 increments the knocking counter.

In S308, engine ECU 200 judges whether a value calculated by dividing the count number of the knock counter by the count number of the ignition counter is not less than the threshold. That is, it is determined whether proportion (frequency) of ignition cycles where knocking has occurred (hereinafter also referred to as a knock cycle) is not less than the threshold in total ignition cycles. If the proportion of knock cycles is not less than the threshold (YES in S308), the processing moves to S310. If not (NO in S308), the processing moves to S314.

In S310, engine ECU 200 makes the determination value V(KX) used for determining whether knocking has occurred for each ignition cycle smaller. The correction amount at this time is larger than the correction amount of the case where the determination value V(KX) is made smaller by using frequency distribution of magnitude values LOG(V).

In S312, engine ECU 200 judges whether the determination value V(KX) has been corrected by using the frequency distribution of magnitude values LOG(V). If the determination value V(KX) has been corrected by using the frequency distribution of magnitude values LOG(V) (YES in S312), the processing moves to S314. If not (NO in S312), the processing returns to S300. In S314, engine ECU 200 resets the ignition counter and the knock counter. Then, this processing ends.

Description will be given for operation of engine ECU 200 of the knocking state determination device according to the present embodiment, based on the structure and the flowchart described above.

When the air fuel mixture is ignited (YES in S300), the ignition counter is incremented (S302). In this ignition cycle, if knocking is determined to have occurred (YES in S304), the knock counter is incremented (S306). If knocking is determined no to have occurred (NO in S304), the knock counter is not incremented.

During the period in which proportion of knock cycles occupied in the total ignition cycles is smaller than the threshold (NO in S308) and correction of the determination value V(KX) using frequency distribution of magnitude values LOG(V) is not carried out (NO in S312), that is, during the period in which magnitude values LOG(V) extracted for creating the frequency distribution do not meet the number for N cycles, processing from S300 to S306 is repeated.

On the other hand, when the proportion of knock cycles is the threshold or more (YES in S308), the determination value V(KX) is made smaller by the correction amount larger than the correction amount of the case where the determination value V(KX) is made smaller using the frequency distribution of magnitude values LOG(V) (S310).

Thereby, it is possible to easily determine that knocking has occurred in knocking determination for each ignition cycle when the knocking generating frequency is large without depending on frequency distribution of magnitude values LOG(V), that is, even before magnitude values LOG(V) for N cycles are not extracted. Therefore, it is possible to increase frequency of retarding spark so as to suppress occurrence of knocking.

Further, at this time, the determination value V(KX) is made smaller by the correction amount larger than the correction amount of the case where the determination value V(KX) is made smaller using frequency distribution of magnitude values LOG(V). Thereby, even in the case where knocking cannot be suppressed by making the determination value V(KX) smaller using the frequency distribution of magnitude values LOG(V), it is possible to suppress occurrence of knocking promptly.

When the determination value V(KX) is corrected (YES in S310, S312), the ignition counter and the knock counter are reset, and processing after S300 is repeated again.

As described above, engine ECU which is the knocking state determination device according to the present embodiment makes the determination value V(KX) smaller by the large correction amount if the proportion of ignition cycle determined as knocking having occurred through knocking determination for each ignition cycle, to the number of total ignition cycles, is larger than the threshold. Thereby, in the case of knocking generation frequency being high, it is possible to suppress occurrence of knocking by making determination that knocking has occurred to be done easily so as to increase frequency of spark being retarded.

Other Embodiments

Figure 25:
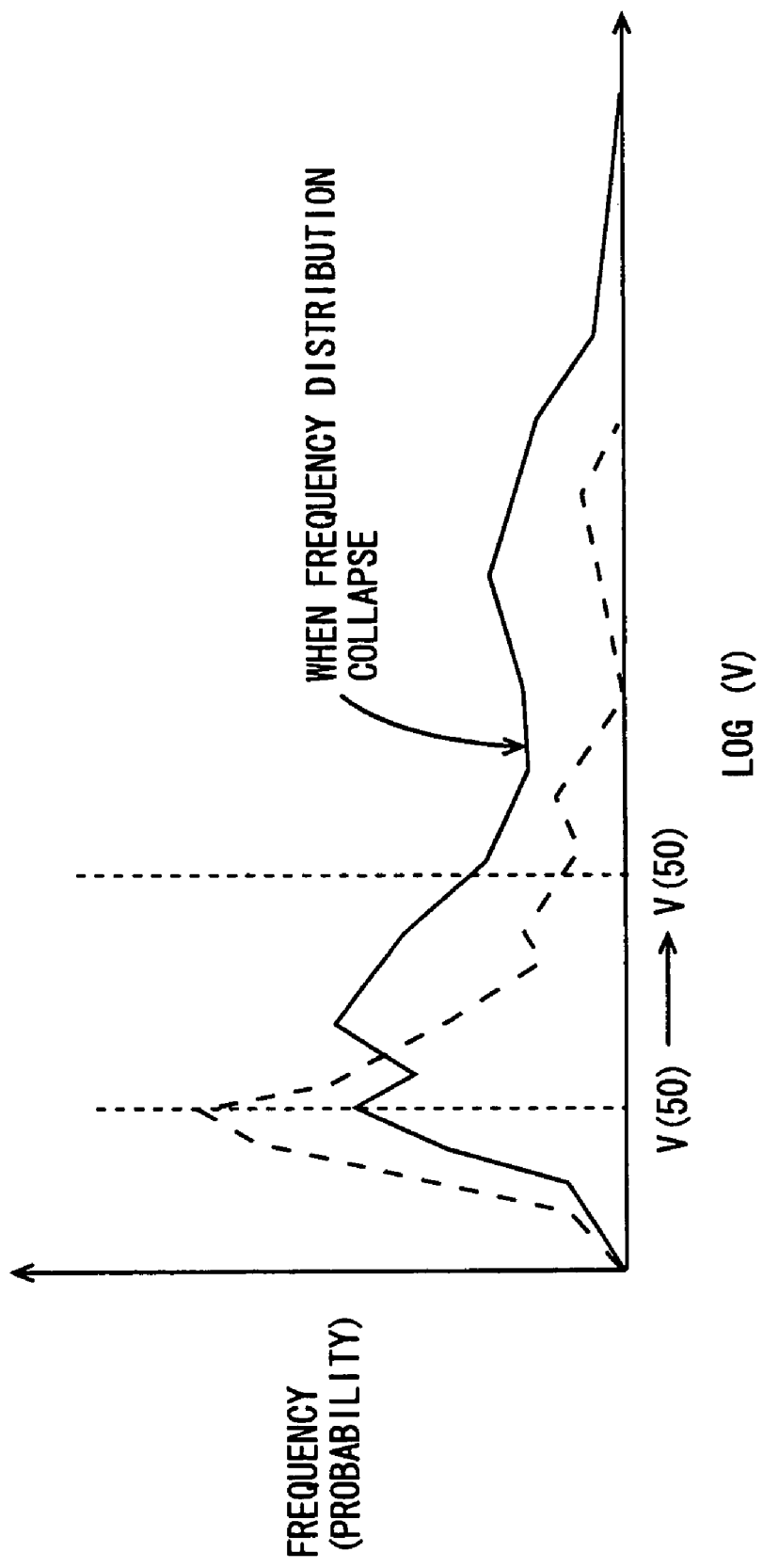
FIG. 25 is a chart (No. 7) showing frequency distribution of magnitude values LOG(V).
Figure 26:
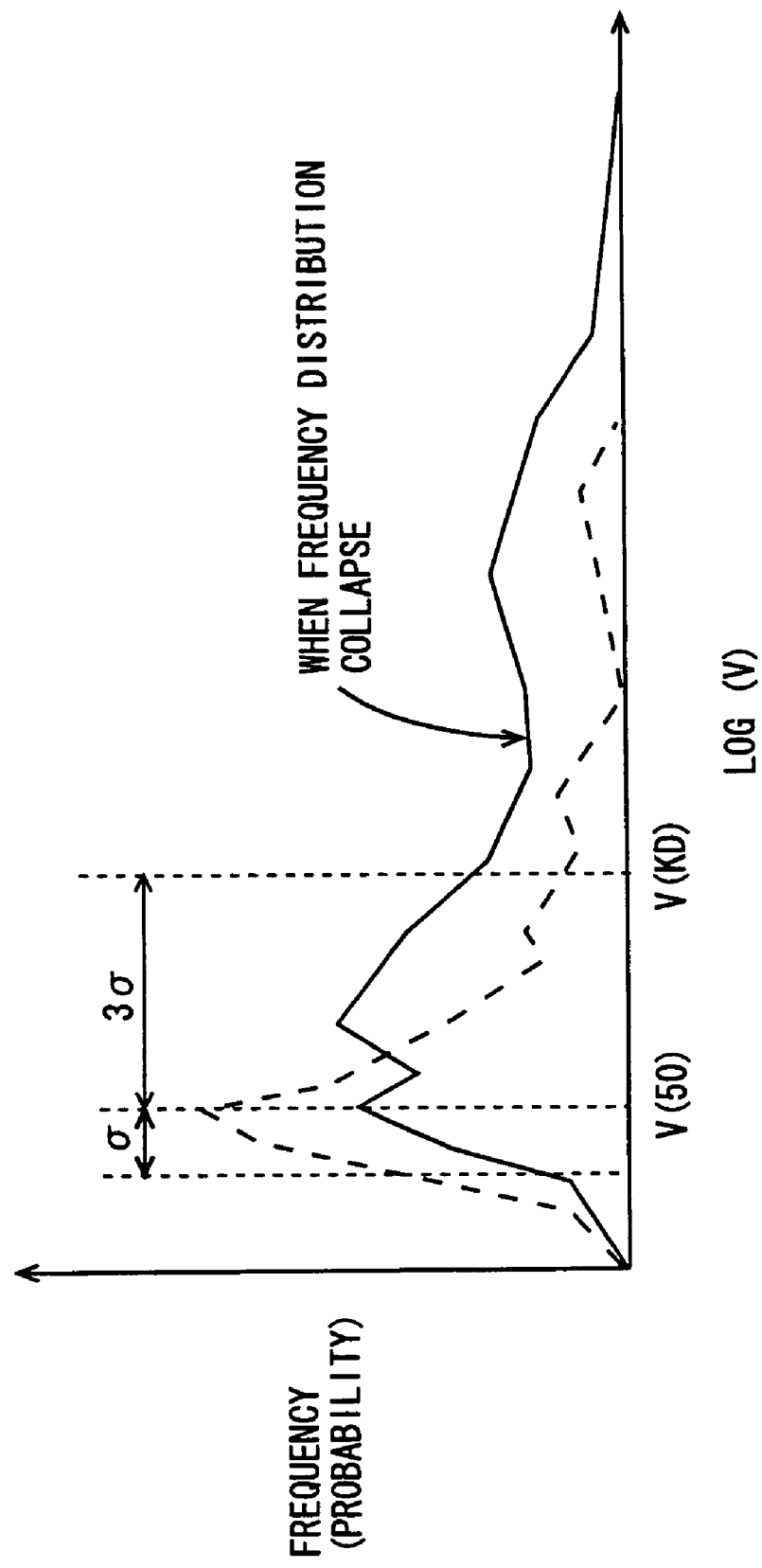
FIG. 26 is a chart (No. 8) showing frequency distribution of magnitude values LOG(V).

In the first embodiment and the second embodiment described above, the knock determination level V(KD) is done by using the median value of magnitude values LOG(V). However, when vibration of large magnitude occurs, calculated magnitude value LOG(V) becomes larger, whereby the shape of frequency distribution is collapsed and the calculated median value may be larger than necessity as shown by the solid line in FIG. 25.

However, even in the case of the shape of frequency distribution being collapsed, the smallest magnitude value LOG(V), among magnitude values LOG(V) where frequency of magnitude values LOG(V) shows a peak (change rate of frequency becomes 0), is often the same value as the median value V(50) of the frequency distribution where knocking is not caused.

In view of the above, the knock determination level V(KD) may be calculated by using the smallest magnitude value LOG(V) among magnitude values LOG(V) where frequency of magnitude values LOG(V) shows a peak, instead of the median value V(50).

That is, the product of the standard deviation and the coefficient U in magnitude values not more than the smallest magnitude value LOG(V), among magnitude values LOG (V) where the calculated frequency shows a peak, may be added to the smallest magnitude value LOG(V) among magnitude values LOG(V) where the calculated frequency shows a peak, to thereby calculate the knock determination level V(KD). Thereby, even when the magnitude value LOG(V) becomes high due to the effects of noise components, it is possible to suppress an increase in the calculated knock determination level V(KD) beyond necessity.

Figure 27:
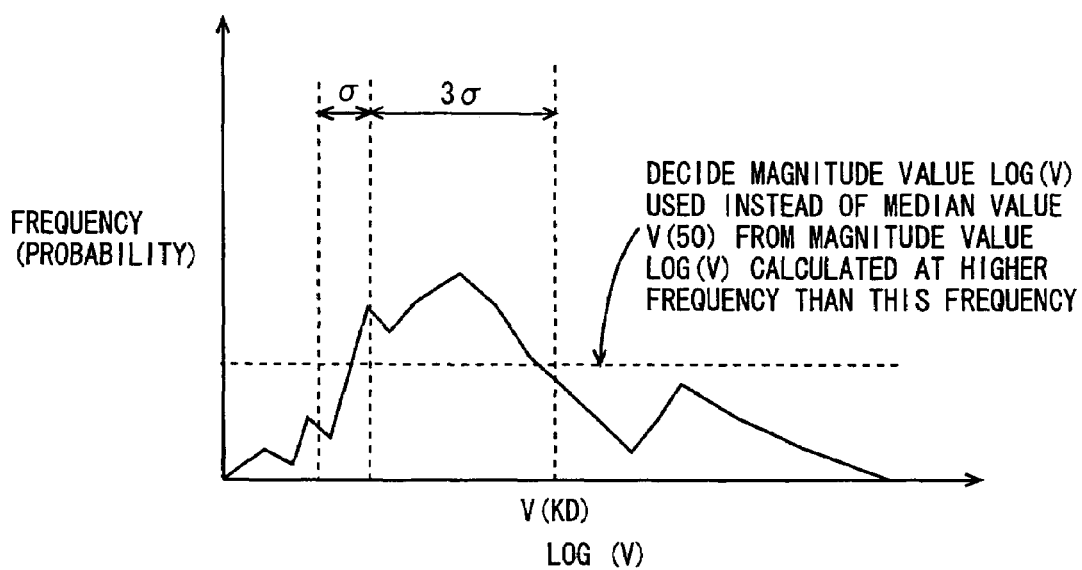
FIG. 27 is a chart (No. 9) showing frequency distribution of magnitude values LOG(V).

Further, as shown in FIG. 27, there is a case where dispersion of magnitude values LOG(V) to be extracted becomes larger, so a peak is shown at lower frequency than general in magnitude values LOG(V) lower than general, depending on a state of vibration caused in engine 100. Therefore, as shown in FIG. 27, the knock determination level V(KD) may be calculated by using the smallest magnitude value LOG(V), among magnitude values LOG(V) calculated at higher frequency than predetermined frequency (e.g., a third of the frequency maximum value) and the frequency of the magnitude values LOG(V) shows a peak. Thereby, even when dispersion of magnitude values LOG(V) becomes large, it is possible to suppress a decrease in the calculated knock determination level V(KD) beyond necessity.

Note that in the case where the knock determination level V(KD) is calculated by using magnitude values LOG(V) that the frequency of the magnitude values LOG(V) shows a peak instead of the median value V(50), the knock determination level V(KD) may be calculated without performing processing for removing maximum values V(MAX) larger than the knock determination level V(KD).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking state determination device in an internal combustion engine, comprising:
   a first detecting portion for detecting a waveform of vibration caused in said internal combustion engine at a predetermined interval for a crank angle;
   a memory portion for previously storing a waveform of vibration of said internal combustion engine;
   a second detecting portion for detecting magnitude values relating to magnitude of vibration caused in said internal combustion engine in a plurality of ignition cycles;
   an extracting portion for extracting a magnitude value satisfying a predetermined condition among said plurality of magnitude values based on a result of comparing said detected waveform with said stored waveform; and a determining portion for determining a knocking occurrence state based on said magnitude value extracted.

2. The knocking state determination device according to claim 1, further comprising:
a knock magnitude calculating portion for calculating a knock magnitude relating to a magnitude of vibration caused by knocking, based on the result of comparing said stored waveform and the detected waveform and a magnitude of vibration caused in said internal combustion engine at said predetermined interval for the crank angle; and
a knocking determining portion for determining whether knocking has occurred in said internal combustion engine for each ignition cycle based on a result of comparing said knock magnitude and a predetermined determination value.

3. The knocking state determination device according to claim 2, wherein said predetermined determination value is set based on at least one of a number of rotations of said internal combustion engine and an amount of air taken in said internal combustion engine.

4. The knocking state determination device according to claim 2, further comprising:
a deviation calculating portion for calculating a value relating to a deviation between said detected waveform and said stored waveform, and
said knock magnitude calculating portion calculates said knock magnitude based on the value relating to said deviation and a magnitude of vibration caused in said internal combustion engine at said predetermined interval for the crank angle.

5. The knocking state determination device according to claim 4, further comprising:
an integrating portion for calculating an integrated value in which a magnitude of vibration caused in said internal combustion engine at said predetermined interval for the crank angle is integrated by said predetermined interval for the crank angle, wherein
said knock magnitude calculating portion calculates said knock magnitude based on a product of the value relating to said deviation and said integrated value.

6. The knocking state determination device according to claim 4, wherein
said deviation calculating portion calculates the value relating to said deviation smaller when said waveform detected include a waveform of vibration caused by an operation of a predetermined part of said internal combustion engine, comparing with a case of not including it, and
said predetermined condition is a condition that it is a magnitude value in an ignition cycle in which a value relating to a deviation larger than a predetermined value is calculated.

7. The knocking state determination device according to claim 6, wherein the predetermined part is at least one of a piston, an injector, an intake valve and an exhaust valve.

8. The knocking state determination device according to claim 1, further comprising:
a deviation calculating portion for calculating a value relating to a deviation between said detected waveform and said stored waveform based on a result of comparing said detected waveform with said stored waveform, wherein
said deviation calculating portion calculates the value relating to said deviation smaller when said detected waveform includes a waveform of vibration caused by an operation of a predetermined part of said internal combustion engine, compared with a case of not including it, and
said predetermined condition is a condition that it is a magnitude value in an ignition cycle in which a value relating to a deviation larger than a predetermined value is calculated.

9. The knocking state determination device according to claim 8, wherein said predetermined part is at least one of a piston, an injector, an intake valve and an exhaust valve.

10. The knocking state determination device according to claim 1, wherein said waveform of vibration is a waveform in which waveforms of vibration of a plurality of frequency bands caused in said internal combustion engine are synthesized.

11. A knocking state determination device in an internal combustion engine, comprising:
means for detecting a waveform of vibration caused in said internal combustion engine at a predetermined interval for a crank angle;
means for previously storing a waveform of vibration of said internal combustion engine;
detecting means for detecting magnitude values relating to magnitude of vibration caused in said internal combustion engine in a plurality of ignition cycles;
extracting means for extracting a magnitude value satisfying a predetermined condition, among said plurality of magnitude values, based on a result of comparing said detected waveform and said stored waveform; and
determining means for determining a knocking occurrence state based on said magnitude value extracted.

12. The knocking state determination device according to claim 11, further comprising:
knock magnitude calculation means for calculating a knock magnitude relating to a magnitude of vibration caused by knocking, based on the result of comparing said stored waveform and said detected waveform and a magnitude of vibration caused in said internal combustion engine at said predetermined interval for the crank angle; and
means for determining whether knocking has occurred in said internal combustion engine for each ignition cycle based on a result of comparing said knock magnitude and a predetermined determination value.

13. The knocking state determination device according to claim 12, wherein said predetermined determination value is set based on at least one of a number of rotations of said internal combustion engine and an amount of air taken in the internal combustion engine.

14. The knocking state determination device according to claim 12, further comprising:
deviation calculating means for calculating a value relating to a deviation between said detected waveform and said stored waveform, and
said knock magnitude calculation means includes means for calculating said knock magnitude based on the value relating to said deviation and a magnitude of vibration caused in said internal combustion engine at said predetermined interval for the crank angle.

15. The knocking state determination device according to claim 14, further comprising:
means for calculating an integrated value in which a magnitude of vibration caused in said internal combustion engine at said predetermined interval for the crank angle is integrated by said predetermined interval for the crank angle, wherein said knock magnitude calculation means includes means for calculating said knock magnitude based on a product of the value relating to said deviation and said integrated value.

16. The knocking state determination device according to claim 14, wherein
said deviation calculating means includes means for calculating the value relating to said deviation smaller when said waveform detected include a waveform of vibration caused by an operation of a predetermined part of said internal combustion engine, comparing with a case of not including it, and
said predetermined condition is a condition that it is a magnitude value in an ignition cycle in which a value relating to a deviation larger than a predetermined value is calculated.

17. The knocking state determination device according to claim 16, wherein said predetermined part is at least one of a piston, an injector, an intake valve and an exhaust valve.

18. The knocking state determination device according to claim 11, further comprising:
deviation calculating means for calculating a value relating to a deviation between said detected waveform and said stored waveform based on a result of comparing said detected waveform with said stored waveform, wherein
said deviation calculating means includes means for calculating the value relating to said deviation smaller when said detected waveform includes a waveform of vibration caused by an operation of a predetermined part of said internal combustion engine, compared with a case of not including it, and
said predetermined condition is a condition that it is a magnitude value in an ignition cycle in which a value relating to a deviation larger than a predetermined value is calculated.

19. The knocking state determination device according to claim 18, wherein said predetermined part is at least one of a piston, an injector, an intake valve and an exhaust valve.

20. The knocking state determination device according to claim 11, wherein said waveform of vibration is a waveform in which waveforms of vibration of a plurality of frequency bands caused in said internal combustion engine are synthesized.

* * * * *